(12) United States Patent
Skinner

(10) Patent No.: US 10,178,827 B2
(45) Date of Patent: Jan. 15, 2019

(54) TRIMMER HEAD WITH PIVOTING POSTS

(71) Applicant: Shakespeare Company, LLC, Columbia, SC (US)

(72) Inventor: David B. Skinner, Columbia, SC (US)

(73) Assignee: Shakespeare Company, LLC, Boca Raton, FL (US)

(\*) Notice: Subject to any disclaimer, the term of this patent is extended or adjusted under 35 U.S.C. 154(b) by 468 days.

(21) Appl. No.: 14/765,082

(22) PCT Filed: Jan. 31, 2014

(86) PCT No.: PCT/US2014/014283
§ 371 (c)(1),
(2) Date: Jul. 31, 2015

(87) PCT Pub. No.: WO2014/121131
PCT Pub. Date: Aug. 7, 2014

(65) Prior Publication Data
US 2015/0366131 A1 Dec. 24, 2015

Related U.S. Application Data

(60) Provisional application No. 61/829,350, filed on May 31, 2013, provisional application No. 61/758,831, filed on Jan. 31, 2013.

(51) Int. Cl.
*A01D 34/416* (2006.01)
(52) U.S. Cl.
CPC .................. *A01D 34/4166* (2013.01)
(58) Field of Classification Search
CPC ................................ A01D 34/4166
USPC ...................... 30/276, 347; 56/12.7
See application file for complete search history.

(56) References Cited

U.S. PATENT DOCUMENTS

| | | | |
|---|---|---|---|
| 7,257,898 B2* | 8/2007 | Iacona | A01D 34/416 30/276 |
| 7,536,792 B2* | 5/2009 | Moore | A01D 34/4166 30/276 |
| 7,603,782 B2 | 10/2009 | Jerez | |
| 7,743,511 B2 | 6/2010 | Jerez | |
| 2005/0126017 A1* | 6/2005 | Fogle | A01D 34/4166 30/347 |
| 2009/0031567 A1 | 2/2009 | Fogle | |
| 2009/0038163 A1* | 2/2009 | Jerez | A01D 34/416 30/276 |

(Continued)

FOREIGN PATENT DOCUMENTS

JP 2007175013 A 7/2007
JP 2009171929 A 8/2009

*Primary Examiner* — Omar Flores Sanchez
(74) *Attorney, Agent, or Firm* — Eversheds Sutherland (US) LLP

(57) ABSTRACT

A fixed-line rotary trimmer head is provided having pivoting posts (line holding mechanisms) which allow folded strips of trimmer line to pivot out of the way when impacting stones, metal posts and the like to reduce wear and tear on the line and reduce line breakage, the trimmer line is loaded from the underside of the trimmer head and follows an approximate 90 degree curvilinear channel so that the distal ends of the line extend out the side of the trimmer head for use, the trimmer head also comprises means for pushing the trimmer line partially out of the channel for ease of use and for removal of unused trimmer line.

14 Claims, 74 Drawing Sheets

(56) References Cited

U.S. PATENT DOCUMENTS

2011/0289785 A1    12/2011    Jerez

* cited by examiner

TRIMMER HEAD WITH PIVOTING POSTS

CROSS REFERENCE TO RELATED APPLICATIONS

This application is a U.S. National Phase Application of International Application No. PCT/US2014/014283 filed on Jan. 31, 2014, which claims the benefit of priority from U.S. Provisional Application No. 61/758,831, filed Jan. 31, 2013 and U.S. Provisional Application No. 61/829,350, filed May 31, 2013, the entire disclosures of which are hereby incorporated herein by reference.

BACKGROUND

Vegetation trimming devices are well known and are commonly used to maintain one's lawn and garden. There are a number of different classes of rotary trimmer heads, defined generally by the manner in which a monofilament trimmer line is fed, spooled or replaced in the trimmer head and/or how the trimmer line is discharged, indexed or lengthened during use of the trimmer head.

A first class of rotary trimmer head is the "self-indexing" trimmer head. With this type of trimmer head, a replaceable spool of trimmer line is used. These trimmer heads contain a mechanism to lock and unlock the relative rotation of the spool of trimmer line based on centrifugal forces which change the length of the line and allow for additional line to be released from the spool. As the line wears, there is less air drag and the rotational speed of the trimmer head increases. With the increased rotational speed, the mechanism unlocks the spool and additional trimmer line is released. The trimmer head speed then slows due to increased air drag on the longer length of trimmer line and the mechanism locks the spool. No manual feeding of new trimmer line is required. This trimmer head design undesirably limits the consumer's options regarding line selection.

A second class of rotary trimmer head is the "bump-fed" or "bump-activated" trimmer head. These trimmer heads are designed with a bump knob or similar ground contacting member that is mechanically linked to the internal spool in the rotary trimmer head such that both parts (the bump knob and the internal spool) have the same rotational speed. As with the self-indexing trimmer heads, the air drag helps to pull the line from the head. In addition, when the bump knob impacts the ground, the difference in rotational speed between the internal spool and the housing also helps push the line out. When the bump knob impacts the ground, the rotational speed of the knob and spool are slowed. The bumping action creates a vertical upward force which lifts the spool upward in the housing and briefly unlocks the spool from the housing so that the spool rotates independently. Some bump-fed trimmer heads are specific to the rotational direction of the trimmer device while others are "universal" and can be used with trimmers which rotate clockwise or counterclockwise. Because the indexing of the line is automatic upon striking the bump knob on the ground, control of the exact length of additional line that is indexed can be difficult.

A third class of rotary trimmer head is the "fixed-line" trimmer head. The majority of aftermarket trimmer heads for rotary trimmers that are sold are fixed-line trimmer heads because they are easily designed to be universally adaptable to essentially any brand of rotary trimmer regardless of the operation of the trimmer head or the direction of rotation. This type of trimmer head is loaded manually and eliminates the need for a spool. The head uses a base having a series of spaced line holders or an easy means of inserting, holding and/or removing multiple trimmer lines. As the line wears, the consumer manually inserts a new length of trimmer line into the line channel. There is no indexing or lengthening of the line during use; and, the consumer can control the length of line that is inserted. Unfortunately, when trimmer line strikes solid objects such as rocks and wooden or metal fences, which is common during use, the trimmer line tends to break thus requiring the consumer to remove the broken line and re-load fresh line quite often.

Incorporating pivoting technology into fixed-line trimmer heads is proving to be beneficial to increasing the life of trimmer line. U.S. Pat. Nos. 7,603,782 and 7,743,511 by Orlando Jerez disclose a trimmer head with pivoting line holding mechanisms, hereby incorporated by reference. The invention disclosed by Orlando Jerez includes many means of holding a folded strip of line. However, all of the concepts introduced by Jerez involve a line holding means located on the top of the trimmer head. The trimmer line is loaded into the line-holding mechanism in the limited space defined by the lower surface of the debris shield on the trimmer, the upper surface of the trimmer head, and the gearbox and/or hub of the trimmer head. Additionally, there is no means provided to assist with removing the used strip of line from the line holding mechanism. During use, the folded strip of line is pulled tightly into the straight through line channels. Many consumers report the need to use a pair of needle nose pliers to pinch the backend of the folded line to remove the U-shaped portion of the used trimmer line.

One of the objectives of this invention is to provide a novel trimmer head with pivoting line-holding mechanisms that can be loaded from the ground-facing surface of the trimmer head.

Another objective of this invention is to provide a novel trimmer head with a means to push a U-shaped piece of trimmer line partially out of the pivoting line-holding mechanism for the purpose of facilitating removal of the remaining line after use.

A third objective of this invention is to provide a method for removal of the unused portion of a trimmer line remaining in the line holder after use of the line for trimming vegetations.

BRIEF SUMMARY

In an embodiment there is provided a trimmer head having a main housing and at least two line holder mechanisms peripherally spaced apart and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device, wherein each of said lengths of trimmer line is inserted into each line holder mechanism from the underside of the main housing without necessitating removal of the trimmer head from the powered trimmer device.

In an embodiment there is provided a trimmer head having a main housing and at least two line holder mechanisms peripherally spaced apart and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device, wherein each of said lengths of trimmer line is inserted into each line holder mechanism from the underside of the main housing without necessitating removal of the trimmer head from the powered trimmer device and said trimmer line is fed through a curvilinear channel where the distal ends of the trimmer line exit on the vertical side of the main housing.

In an embodiment there is provided a trimmer head wherein unused lengths of trimmer line can easily be removed from the trimmer head without necessitating removal of the trimmer head from the powered trimmer device, such means comprising an elongated vertical blade, said blade movable between a first upper position where the blade is not in contact with said trimmer line and a second lower position where the blade contacts the trimmer line at a point exterior of the underside of a trimmer head main housing, said blade pushing the trimmer line out and away from the underside of the main housing, and a spring and an actuator, said spring biasing the blade into the first upper position and said actuator moving the blade to the second lower position when activated.

For a fuller understanding of the nature and advantages of the present invention, reference should be made to the ensuing detailed description and accompanying drawings.

DETAILED DESCRIPTION

Figure 14:
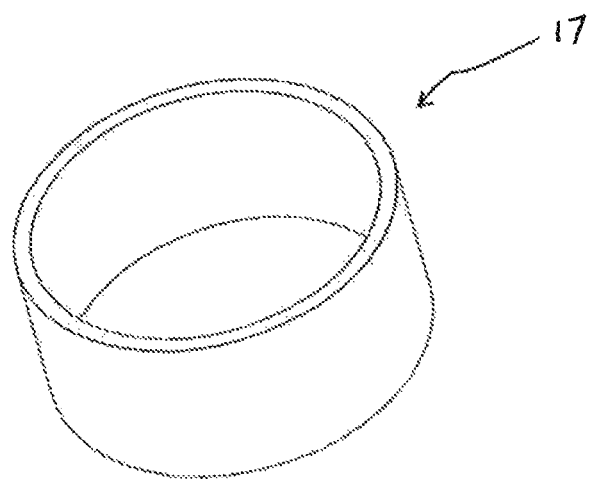
FIG. 14 is a perspective view of the bearing ring of the pivot post of the embodiment shown in FIG. 1.
Figure 15:
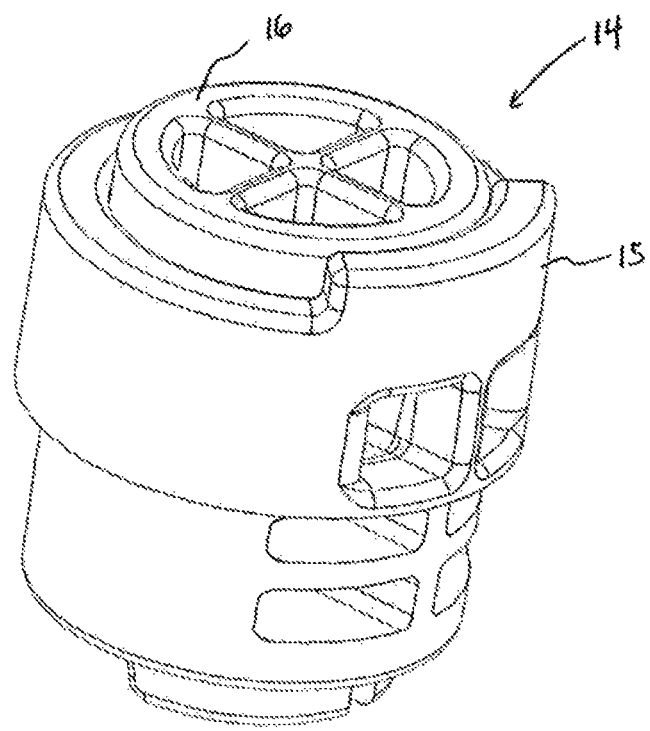
FIG. 15 is a perspective view of a pivot post assembly of the embodiment shown in FIG. 1
Figure 16:
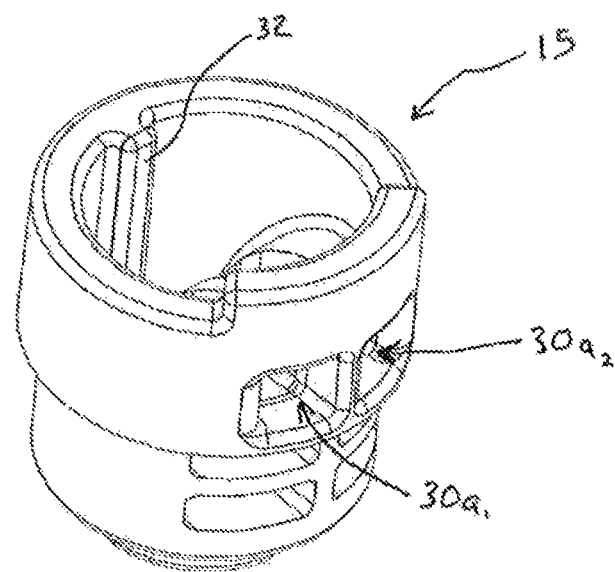
FIG. 16 is a perspective view of a lower part of the pivot post assembly of FIG. 15.

A first embodiment of the trimmer head 10 of the present invention is shown in FIGS. 1-24. The embodiment shown in FIGS. 1-24 incorporates three line holding mechanisms 14a-14c. One of the line holding mechanisms 14 is shown in FIG. 15. The terms "line holding mechanism", "pivoting post" and "pivot post" are used herein interchangeably. The head 10 comprises a main housing 11 and a cover 12. The main housing 11 of the trimmer head 10 as shown in FIGS. 8 and 9 has three openings 29 for receiving each line holding mechanism 14.

Figure 1:
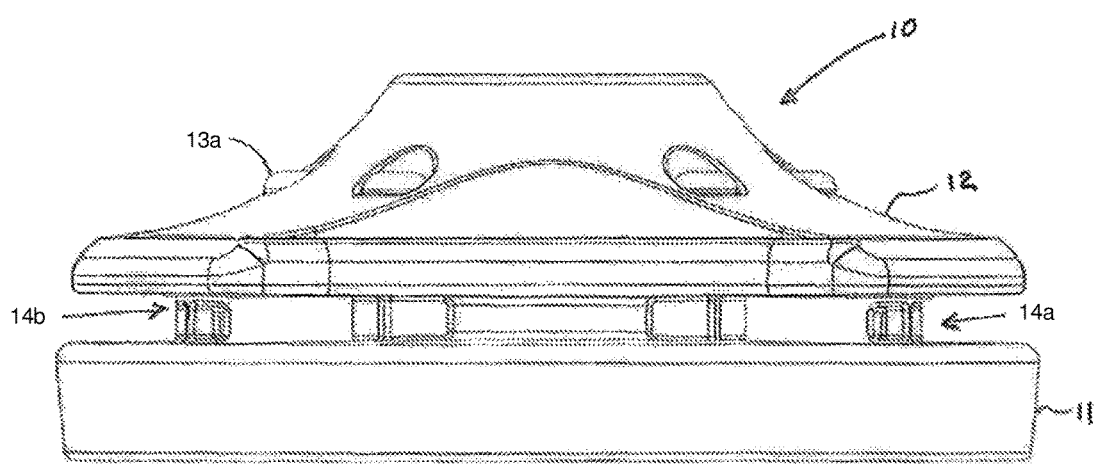
FIG. 1 shows a side view of a first embodiment of the invention.
Figure 2:
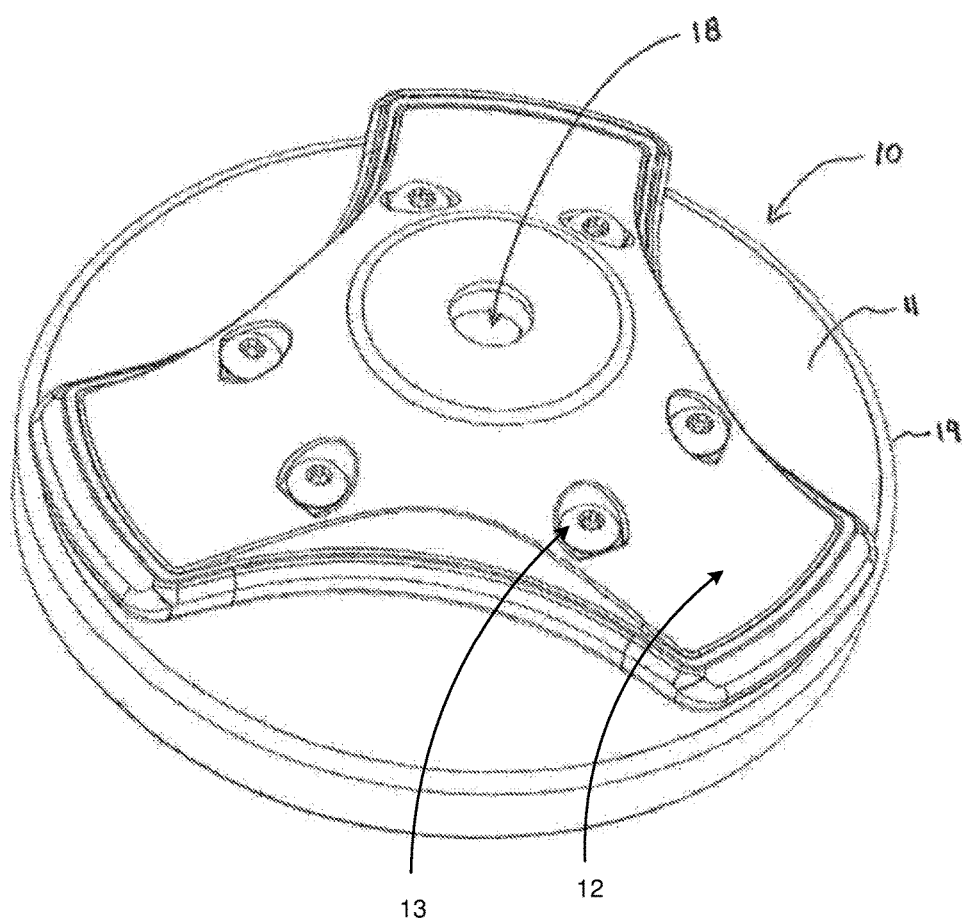
FIG. 2 shows a perspective view of the embodiment shown in FIG. 1.
Figure 3:
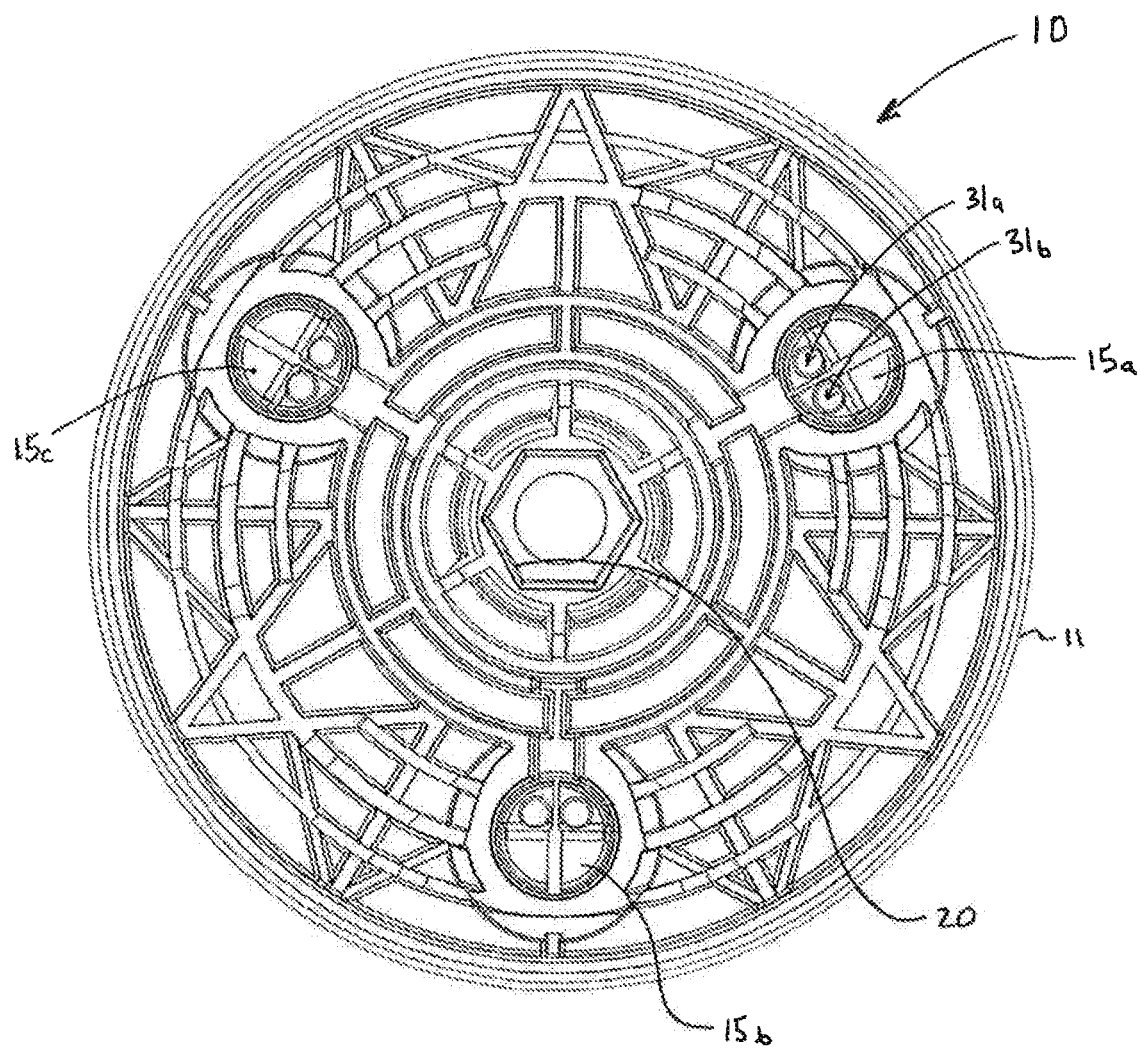
FIG. 3 shows a bottom view of the embodiment shown in FIG. 1.
Figure 4:
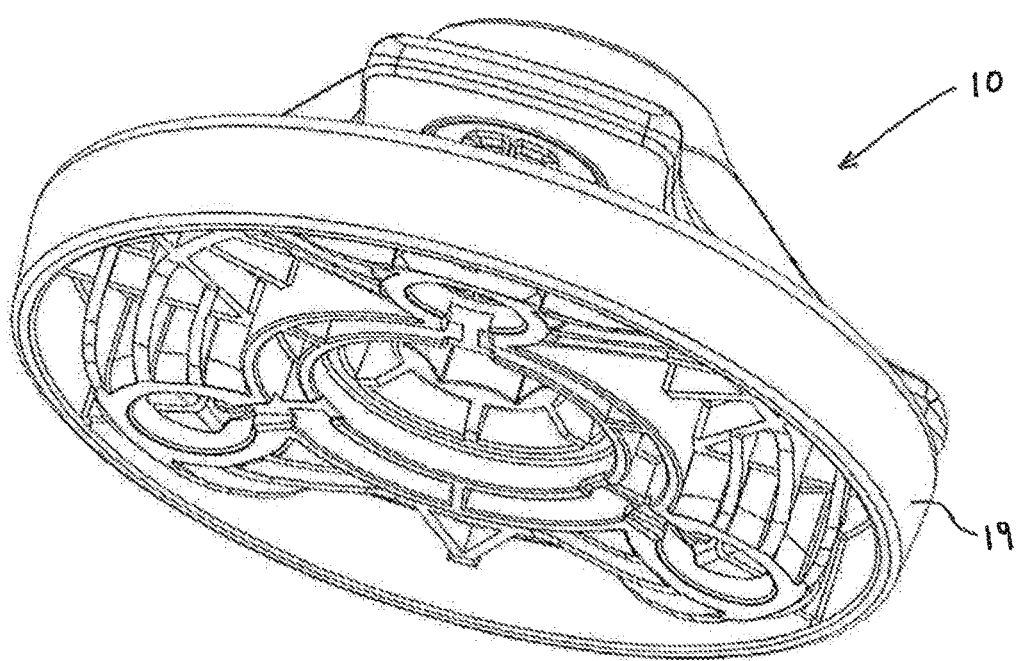
FIG. 4 shows a bottom perspective view of the embodiment shown in FIG. 1.
Figure 5:
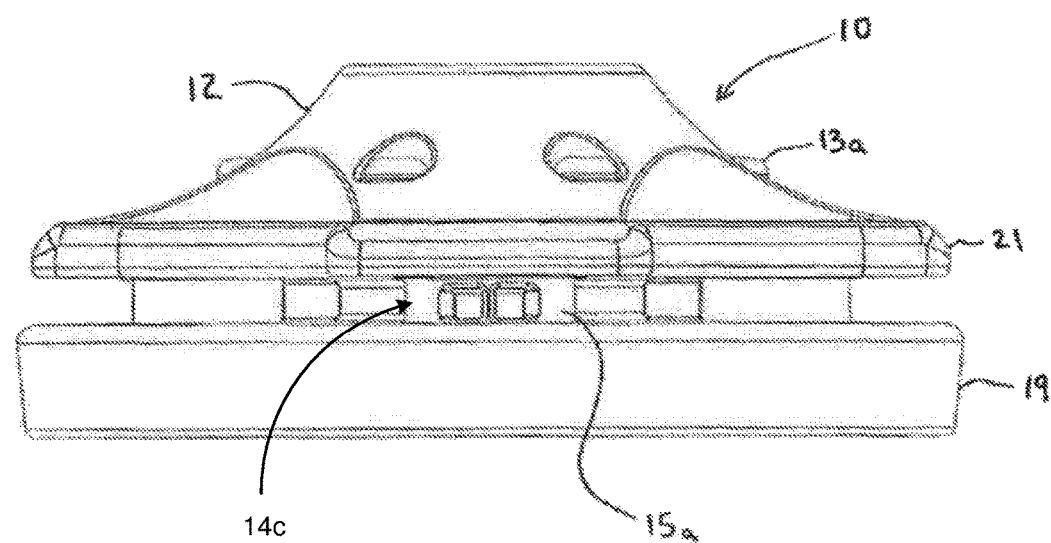
FIG. 5 is a side view of the embodiment shown in FIG. 1.
Figure 6:
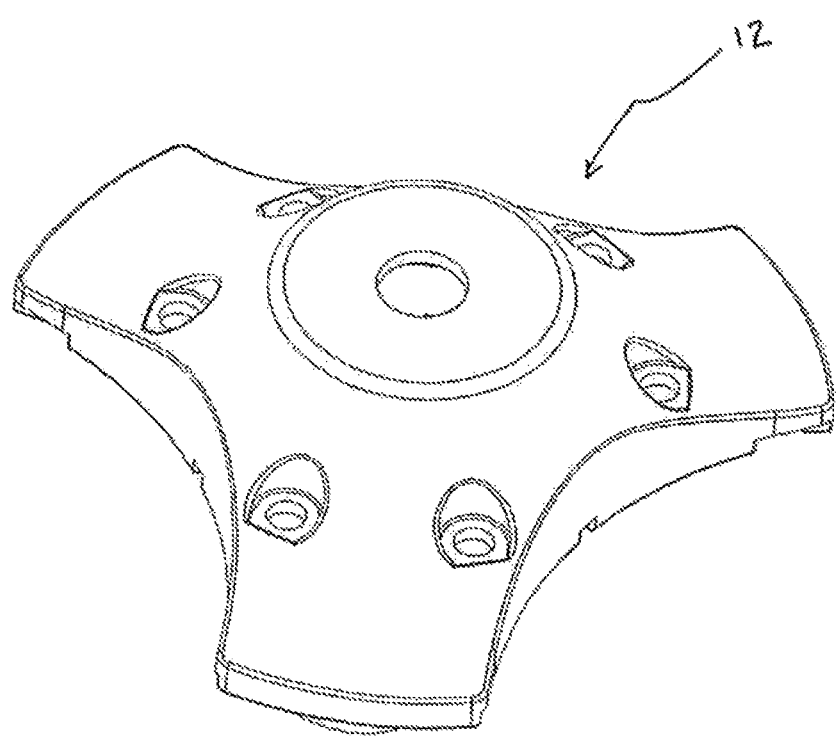
FIG. 6 is an upper perspective view of the cover of the embodiment shown in FIG. 1.
Figure 8:
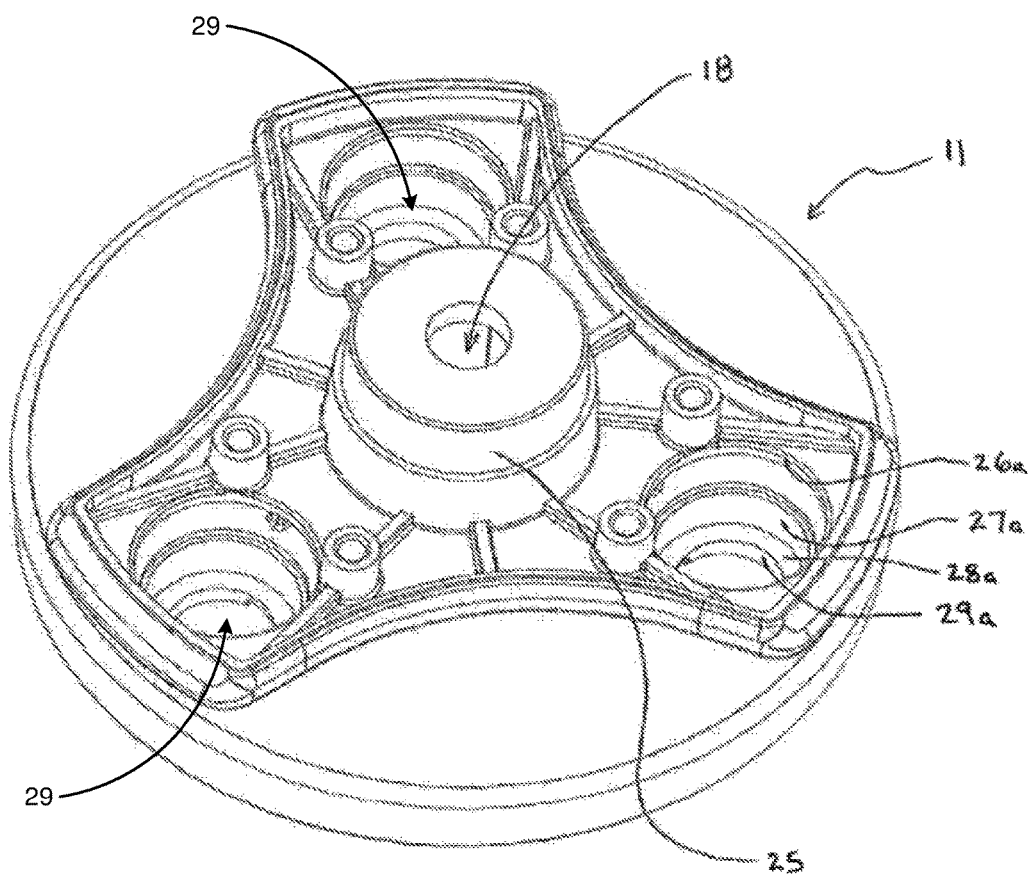
FIG. 8 is an upper perspective view of the main housing of the embodiment shown in FIG. 1.
Figure 9:
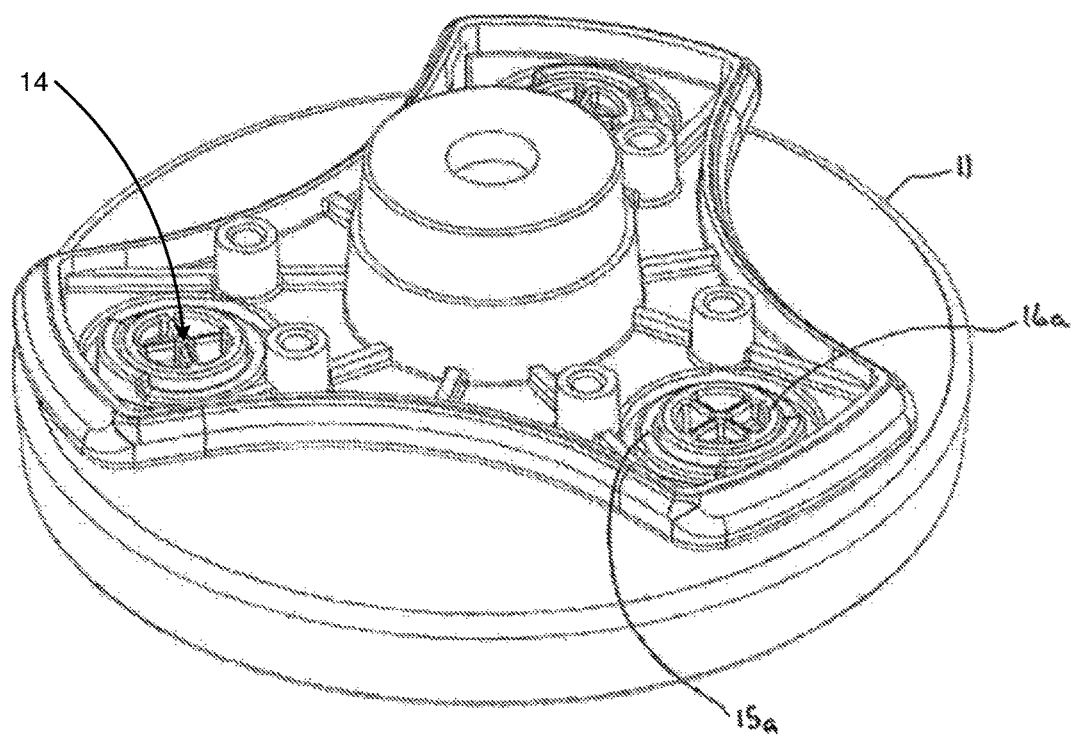
FIG. 9 is an upper perspective view of the main housing of the embodiment shown in FIG. 1 with the pivot post installed.
Figure 10:
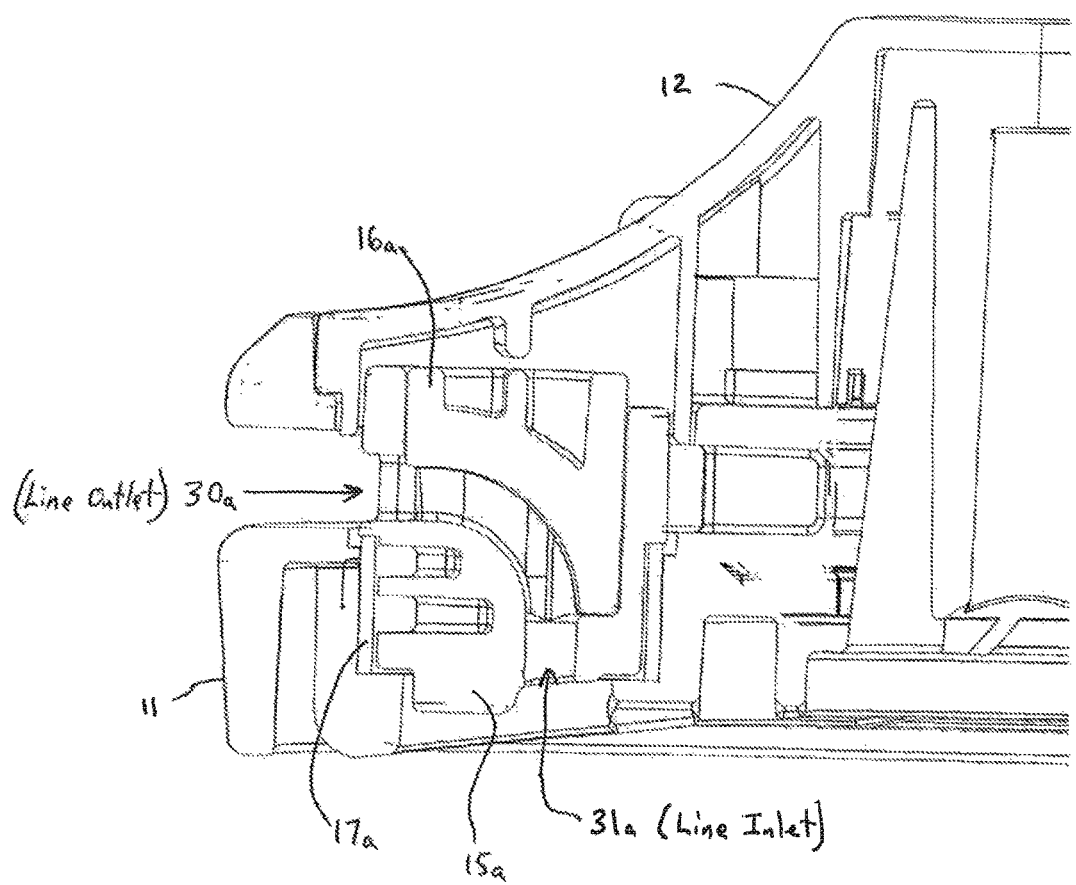
FIG. 10 is a cutaway view of an installed pivot post assembly of the embodiment shown in FIG. 1.
Figure 11:
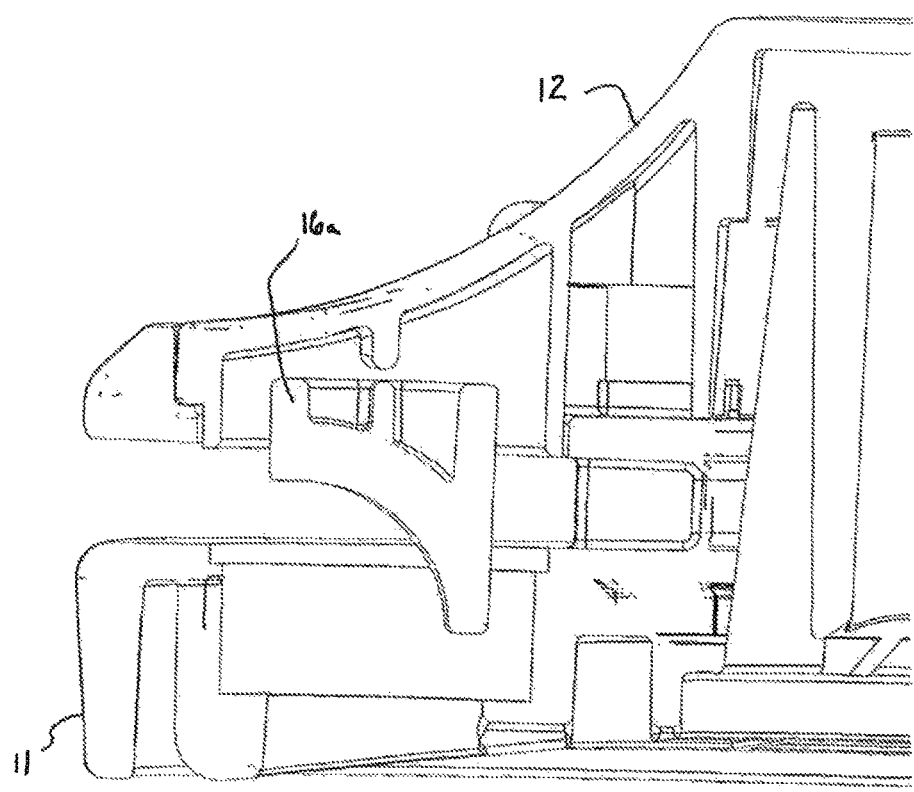
FIG. 11 is a cutaway view of an installed pivot post assembly of the embodiment shown in FIG. 1.
Figure 12:
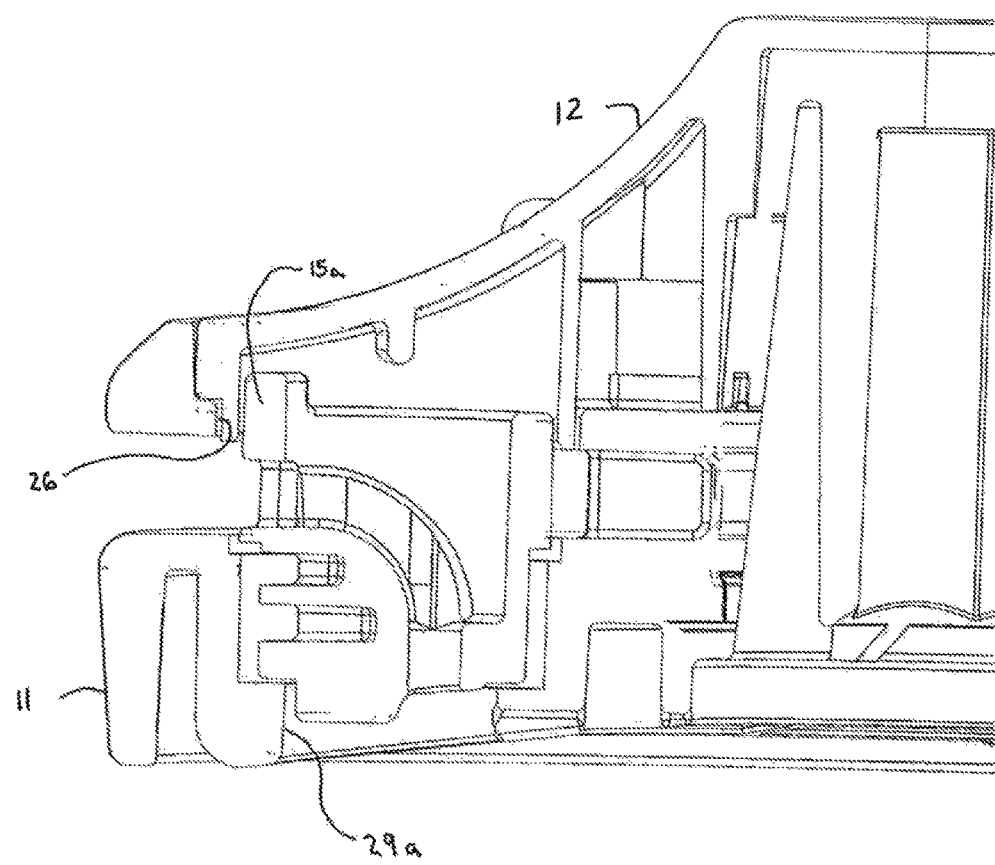
FIG. 12 is a cutaway view of an installed pivot post assembly of the embodiment shown in FIG. 1.

Main housing 11 can best be seen in FIGS. 3, 4, 5, 8 and 9. FIGS. 3 and 4 show the underside of main housing 11 and FIGS. 8 and 9 show the top of main housing 11. The main housing 11 has three pairs of openings 26a-29a. Main housing 11 is constructed of two spaced layers 19 and 21 (best seen in FIG. 5) connected by a central hub 25. Each pair of openings are aligned vertically, one in each layer of the main housing 11, and constructed so that the assembled line holding mechanism 14 can be inserted into the openings from above (FIG. 9 shows line holding mechanism 14 inserted into opening). As can best be seen in FIG. 8, openings include upper plate opening 26a, first lower plate opening 27a, lower plate stop 28a, and second lower plate opening 29a. A bearing sleeve 17 (e.g., as shown in FIG. 14) is inserted into the first lower plate opening 27a, resting on stop 28a. Then the assembled line holding mechanism 14 is installed into the same opening through upper plate opening 26 and through bearing sleeve 17. After all line holding mechanisms 14 being used are in place, cover 12 is placed over the main housing 11 to hold the line holding mechanisms in place. Cover 12 is fastened to the main housing 11 preferably using six screws 13, as shown in FIG. 2, although other fastening mechanisms used in the industry could also be utilized.

Figure 7:
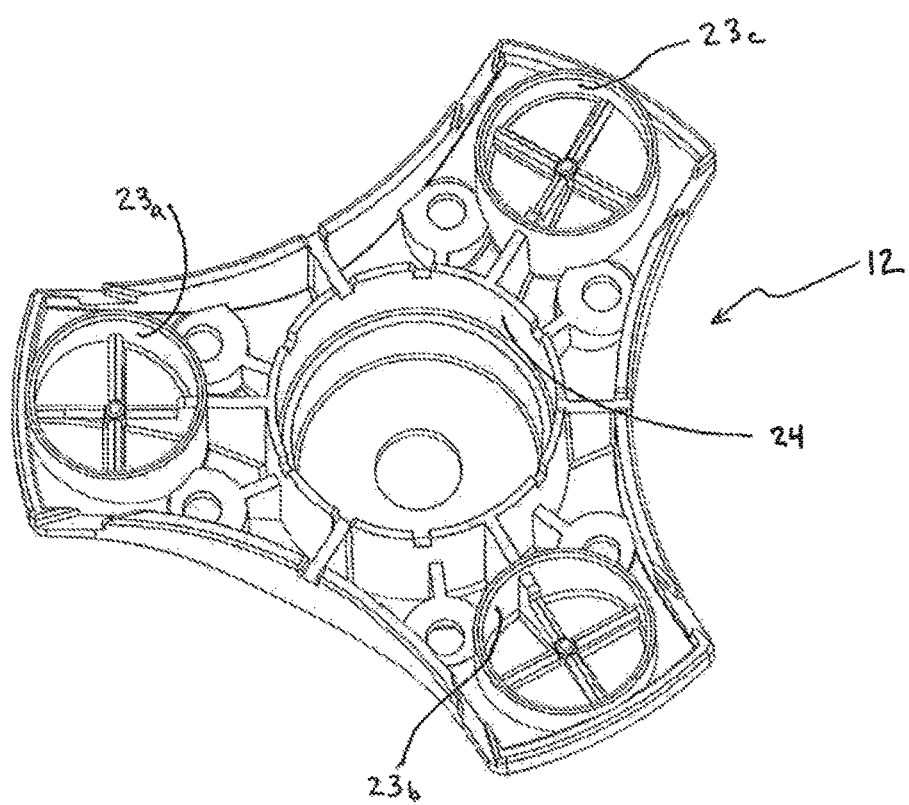
FIG. 7 is a lower perspective view of the cover of the embodiment shown in FIG. 1.

As shown best in FIGS. 2 and 7, cover 12 comprises a three-pronged shaped to accommodate the number of line holding mechanisms 14 utilized. Cover comprises opening 18 located in the center and shaped/sized to allow passage of a trimmer drive shaft there through to accomplish attachment of head 10 to trimmer device (not shown). FIG. 7 best shows cavities 23a-23c for receiving of line holding mechanism 14. Cover 12 and cavity 23 (the necessary number of cavities depending on the number of line holding mechanisms 14 employed) fit over line holding mechanism 14. Opening 24 is shaped and sized to receive the main housing hub 25 to further secure cover to main housing.

Referring to FIG. 3, the trimmer head 10 is attached to a trimmer machine by placing a fastener (not shown) with a hexagon head into the hexagon shaped cavity 20. Either the stem from the trimmer or the stem from a bolt would pass through the opening 18 shown in FIG. 2. The head would then be rotated to turn the fastener, until the head was fully threaded onto the trimmer machine.

The line holding mechanisms are confined vertically between the bearing sleeves 17 and the cover 12, and are confined along their perimeters by the perimeter of each opening 26a, 27a, 29a in the housing 11. The line holding mechanisms 14 are allowed to pivot about a vertical axis.

Figure 13:
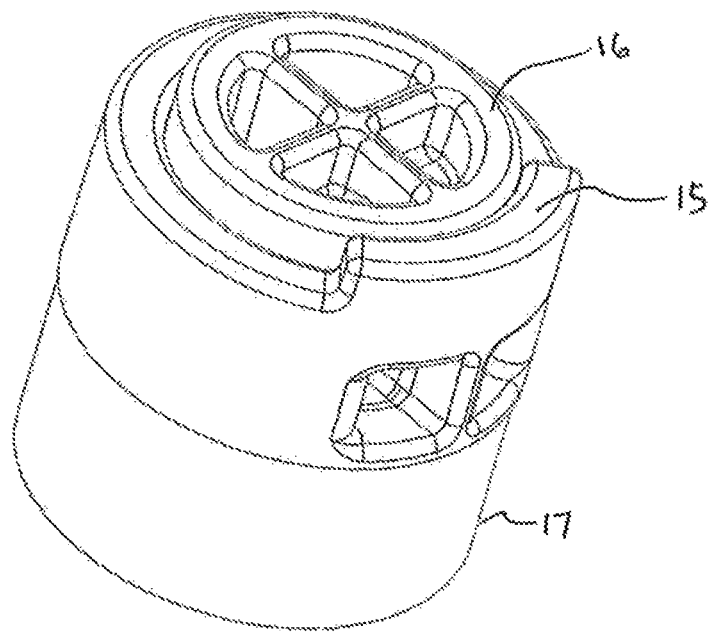
FIG. 13 shows the pivot post assembly of the embodiment shown in FIG. 1.

Each of the pivoting line holding mechanisms 14 are preferably assembled using five pieces, excluding the bearing sleeve 17. The upper housing 16 for the line holding mechanism is shown separately in FIGS. 21-24. This is placed over the lower housing 15, shown separately in various views in FIGS. 16-20. The upper housing 16 and lower housing 15 as assembled are shown in FIGS. 13 and 15. The interior surfaces of the upper and lower housings are shaped such that when combined, each pair creates a passageway for holding a folded strip of line. The two line channels 35 are separated by interior surface rib 36 shown in FIG. 17. Rib 32 further receives slot 33 from upper housing to secure line holding mechanism together. Interior surface 36 of lower housing provides support surface for upper plate and helps to define channels 35. Opening 37 (FIG. 18) can receive a tool as needed to assist with removal of line from the head 10. One advantage of this multi-piece construction of the line channels is that the line channels are not restricted to being parallel. The line channels are curvilinear, allowing the line to be loaded at a ninety degree angle from the exit position. However, the design is not restricted to a ninety degree orientation. The angle formed by the line portion entering the pivoting assembly relative to the line portion existing the pivoting assembly could be greater or less than ninety degrees.

Figure 17:
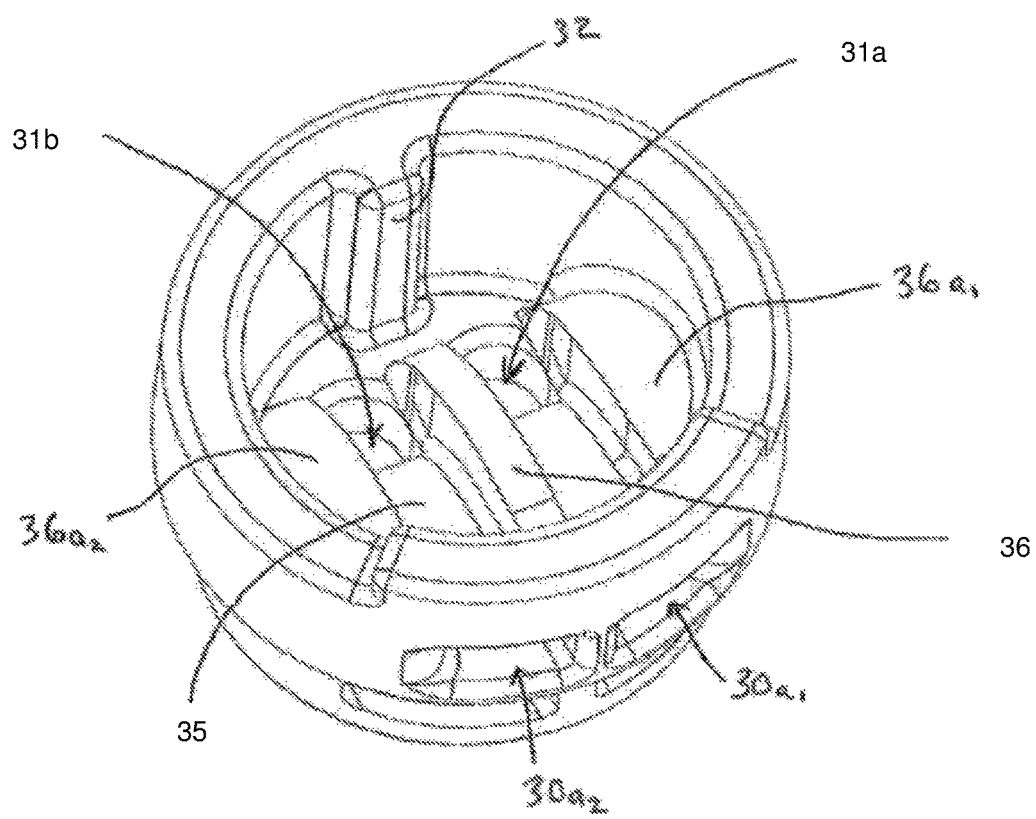
FIG. 17 is a perspective view of a lower part of the pivot post assembly of FIG. 15.
Figure 18:
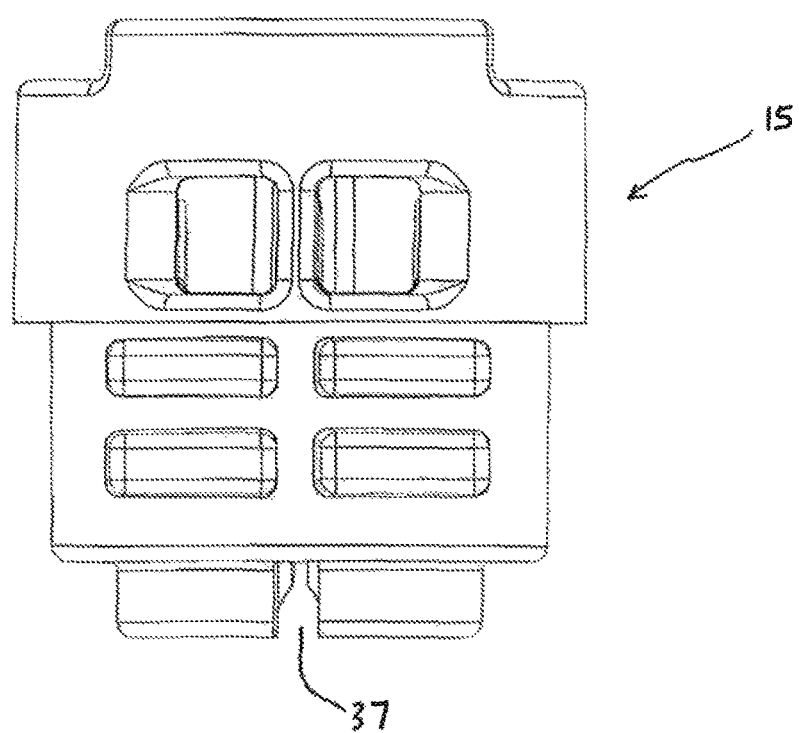
FIG. 18 is a side view of the lower part of the pivot post assembly of FIG. 15.
Figure 19:
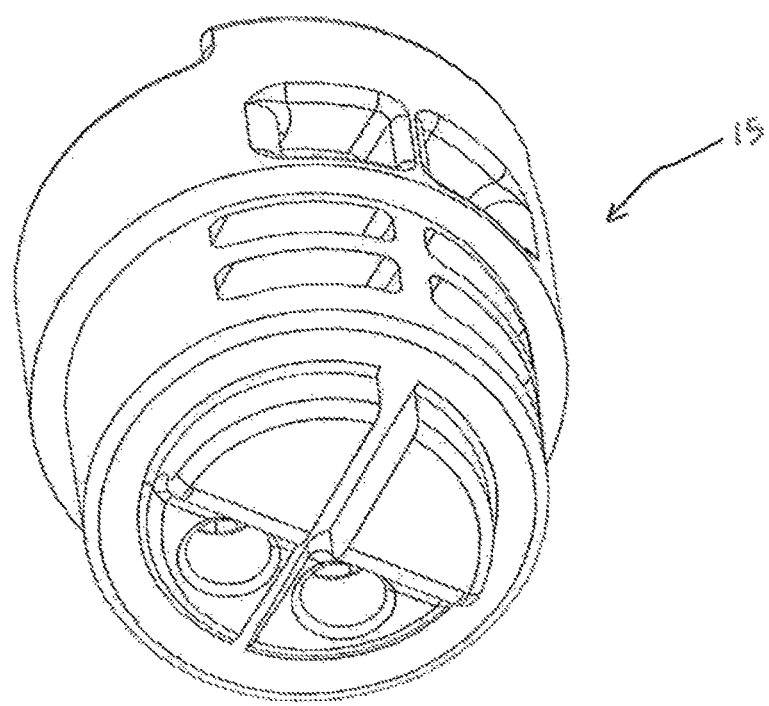
FIG. 19 is a lower perspective view of the lower part of the pivot post assembly of FIG. 15.
Figure 20:
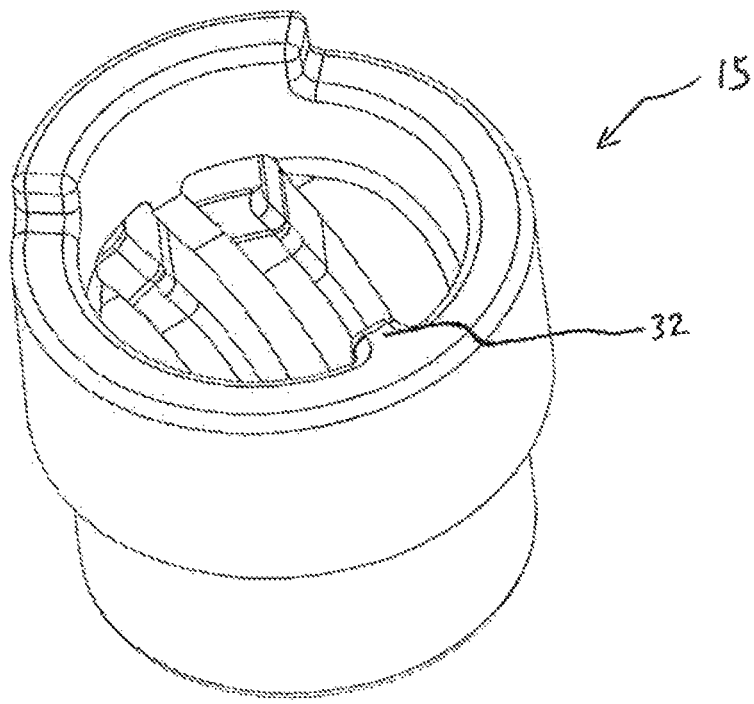
FIG. 20 shows the lower part of the pivot post assembly of FIG. 15.
Figure 21:
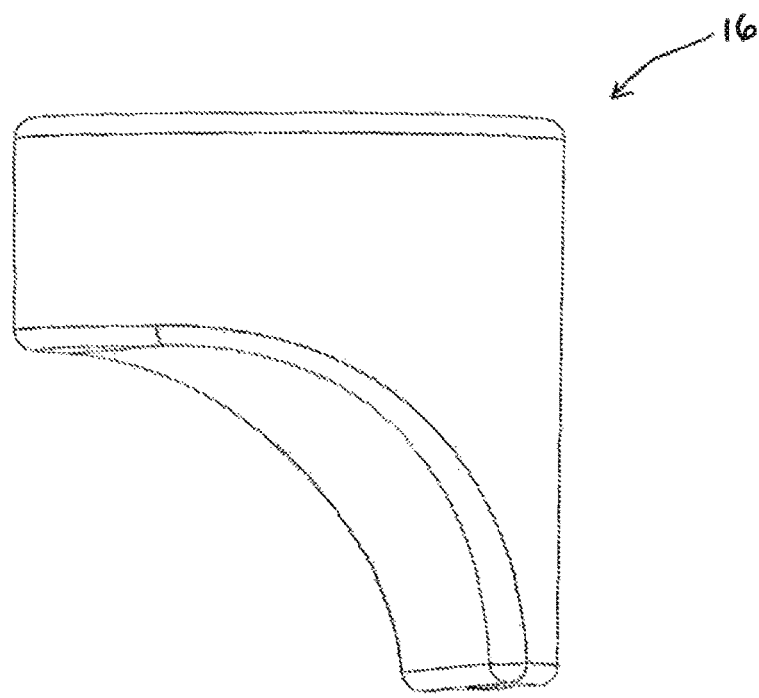
FIG. 21 is a side perspective view of the upper part of the pivot post assembly of FIG. 15.
Figure 22:
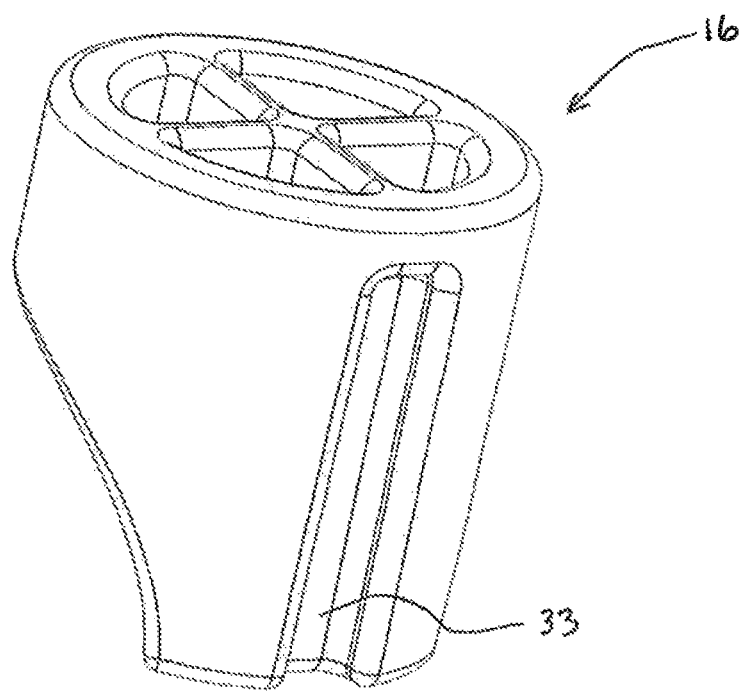
FIG. 22 is a perspective view of the upper part of the pivot post assembly of FIG. 15.
Figure 23:
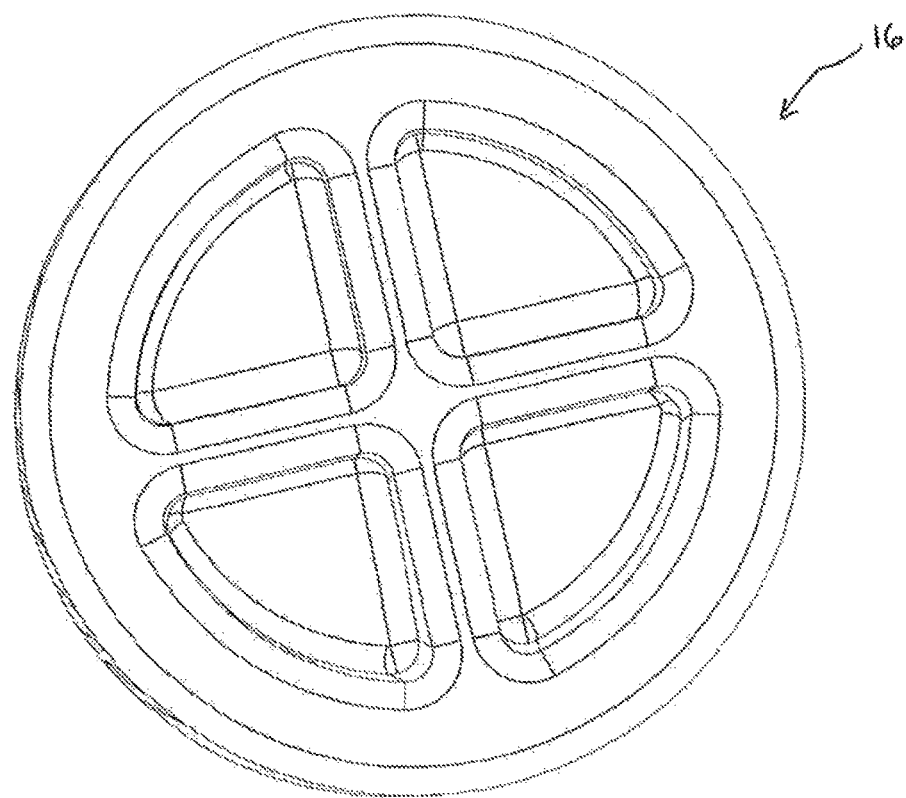
FIG. 23 is a top view of the upper part of the pivot post assembly of FIG. 15.
Figure 24:
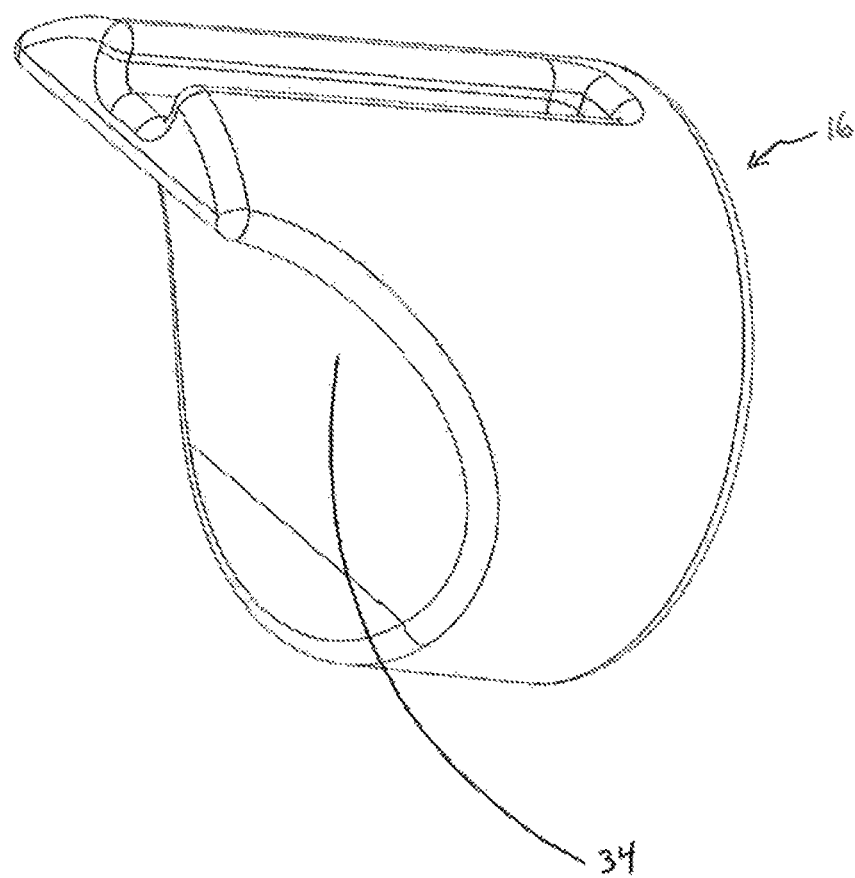
FIG. 24 is a bottom perspective view of the upper part of the pivot post assembly of FIG. 15.

Each pivoting line holding mechanism 14 is designed to hold one folded strip of line. Referring to FIGS. 15 and 17, the two distal ends of line are inserted into the openings 31a and 31b from the underside of main housing 11. The trimmer line ends are pushed into the line channels 35 discussed above which are formed between the upper 16 and lower 15 housings. The line ends will follow the curvilinear path and will eit the line holding mechanism 14 at line outlets 30a, 30b located on the side of main housing 10 (see FIG. 10). The user would continue to push the line into the channel, or would pull the free ends of the trimmer line until the folded strip of line is fully inserted. This process would be repeated until a folded strip of trimmer line is installed into each of the three line-holding mechanisms for this embodiment.

The preferred embodiment of the present invention has three pivoting line-holding mechanisms, spaced 120 degrees apart. However, other embodiments having various numbers of the pivoting line-holding mechanisms equally spaced would also function equally well. For example, the trimmer head could be designed to have two pivoting line-holding mechanisms spaced 180 degrees apart, or four pivoting line-holding mechanisms, each equally spaced 90 degrees apart. Likewise, five or more pivoting line-holding mechanisms could be used as long as the weight was uniformly distributed to allow for balanced rotation about a vertical axis. Similarly, the number of screws or other mechanisms utilized to secure the cover to the main housing and thereby secure the line holding mechanisms within the head cavity may also vary accordingly.

Figure 25:
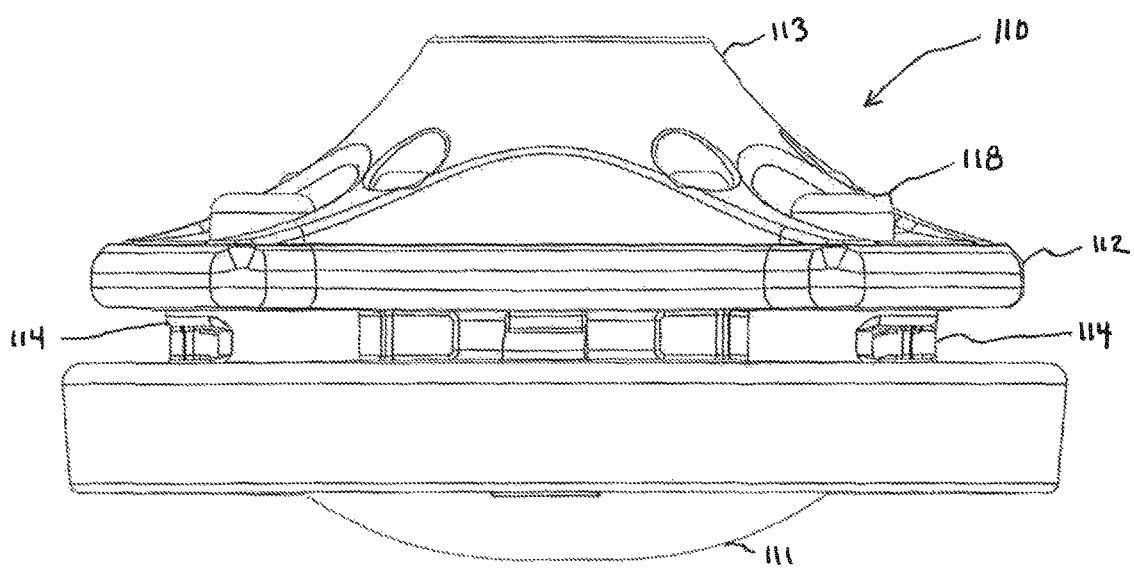
FIG. 25 shows a side view of an embodiment of the invention.
Figure 26:
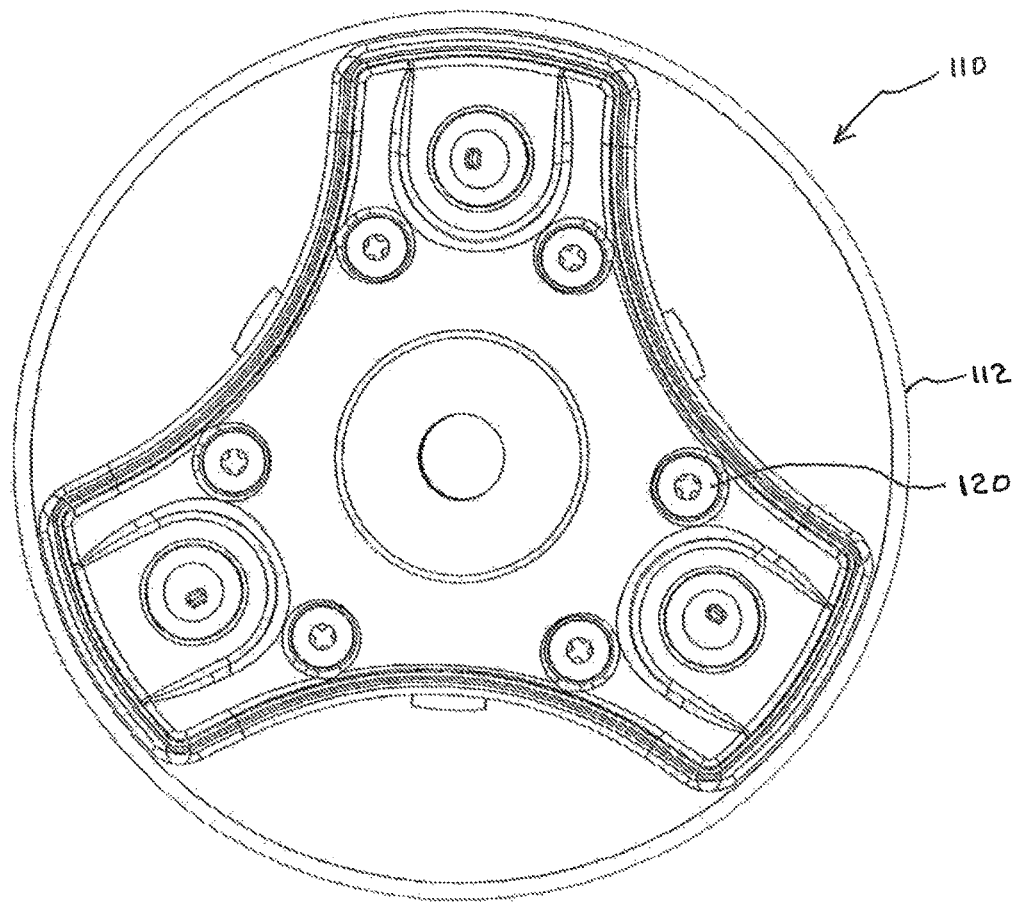
FIG. 26 shows a top view of the embodiment shown in FIG. 25.
Figure 27:
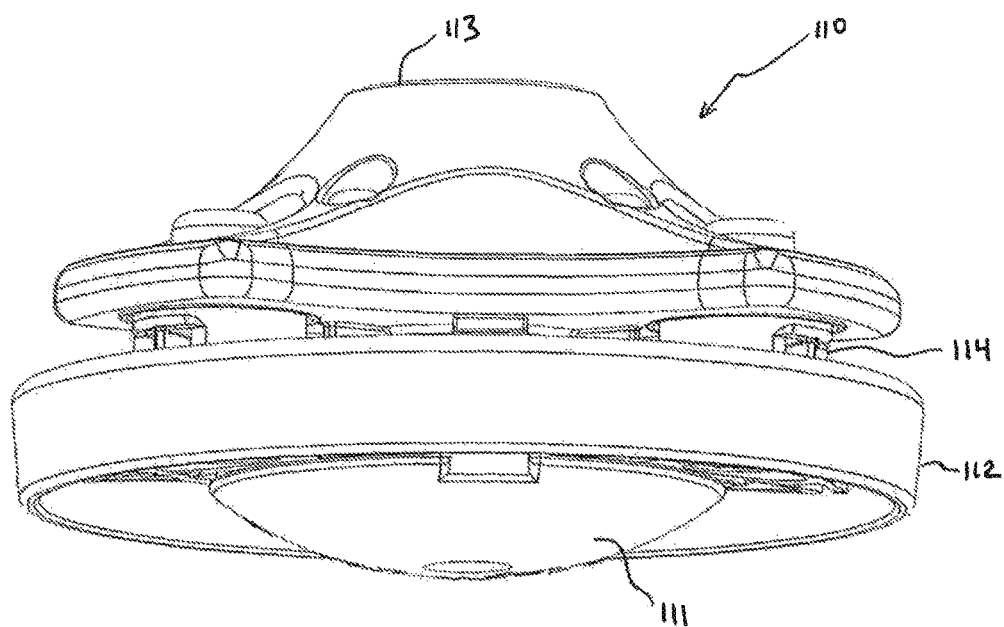
FIG. 27 shows a lower perspective view of the embodiment shown in FIG. 25.
Figure 28:
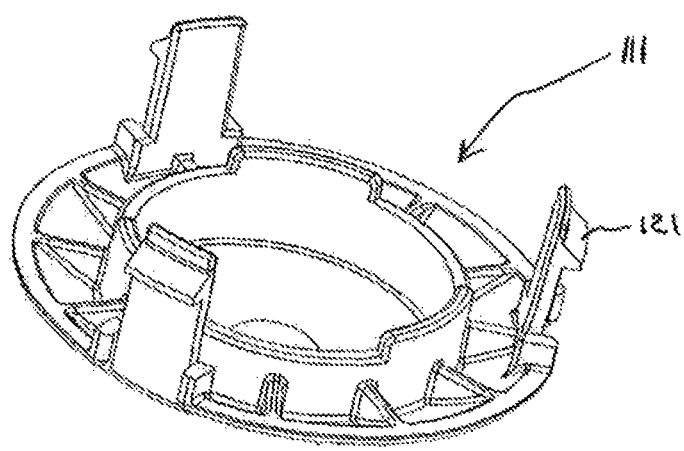
FIG. 28 is a perspective view of the ground contacting member designed to snap onto the lower side of the embodiment shown in FIG. 25.

For the embodiment shown in FIGS. 1-24 as well as the embodiment shown in FIGS. 25-55 and most generally in FIGS. 25-27, the outer most perimeter of the head is preferably round. However, this is not a functional requirement. The outer most perimeter of the head could be any shape as long as it was balanced with regards to rotational spinning about a vertical axis.

Figure 32:
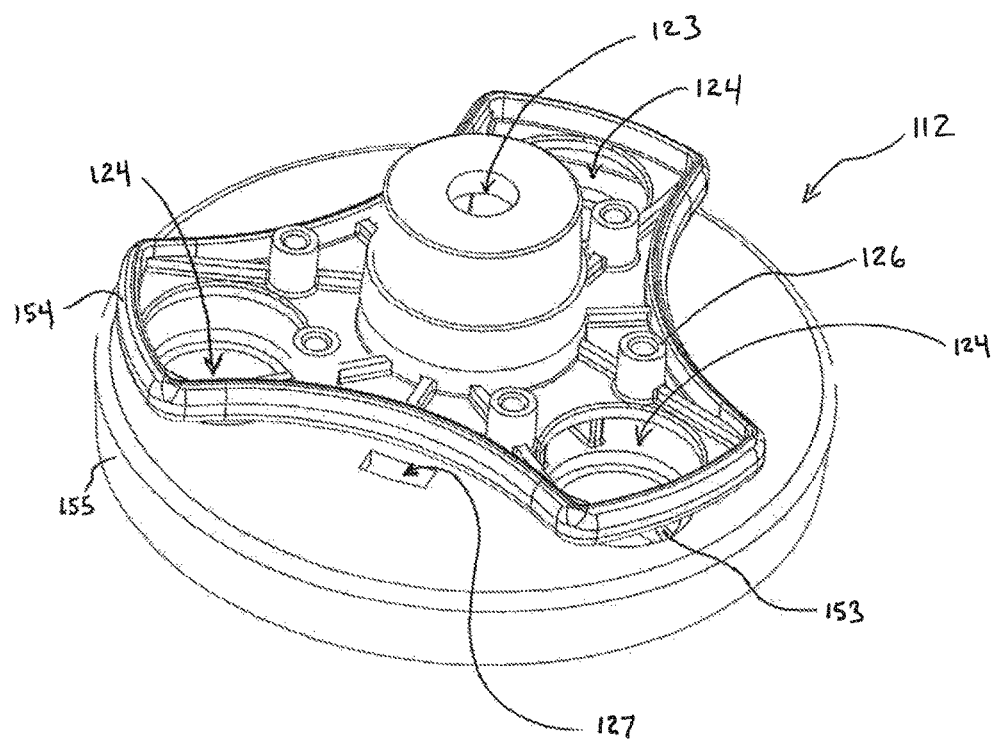
FIG. 32 is a side perspective view of the main housing of the trimmer head of the embodiment shown in FIG. 25.
Figure 33:
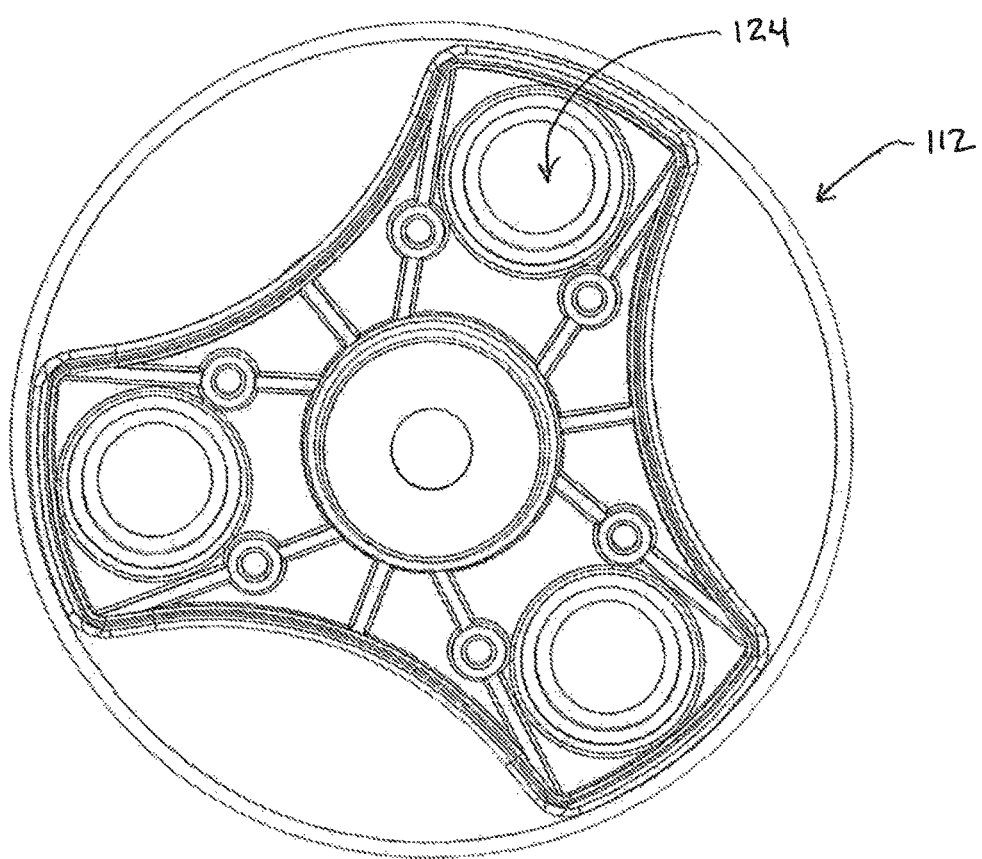
FIG. 33 is a top view of the main housing of the trimmer head of the embodiment shown in FIG. 25.
Figure 34:
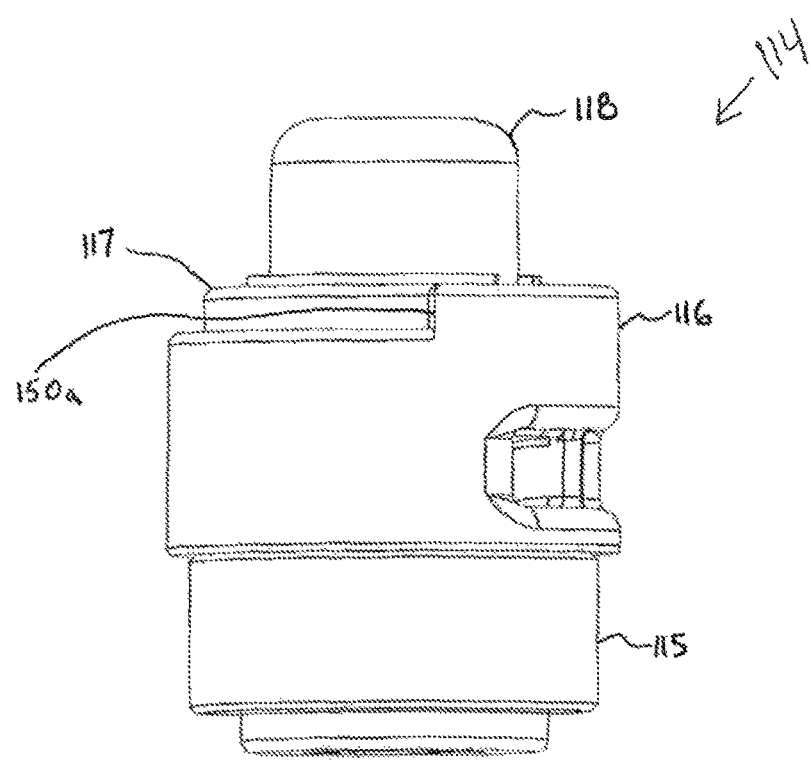
FIG. 34 is a side perspective view of the line holding mechanism of the embodiment shown in FIG. 25.
Figure 35:
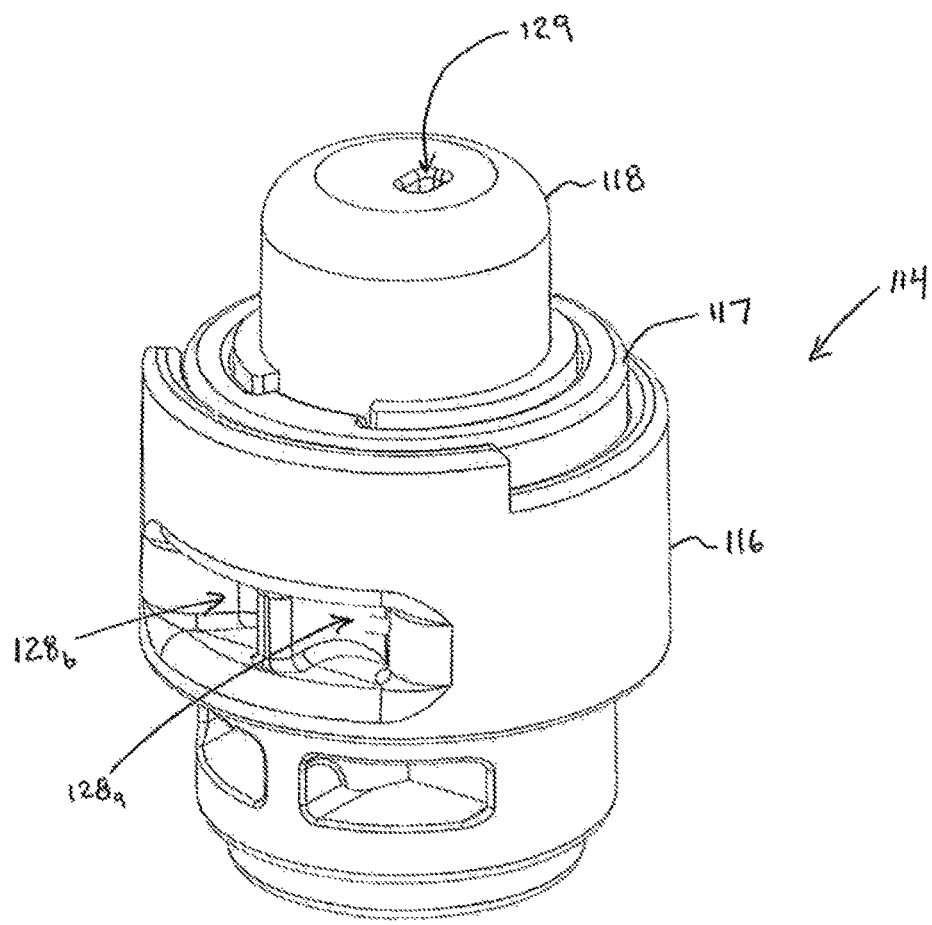
FIG. 35 is a top perspective view of the line holding mechanism of the embodiment shown in FIG. 25.

The embodiment shown in FIGS. 25-55 is generally identical to the embodiment described above in FIGS. 1-24 but features an optional ground contacting member 111 and blade 119. This embodiment incorporates three line-holding mechanisms 114 spaced 120 degrees apart. One of the line holding mechanisms 114 is shown in FIG. 35. The main housing 112 of the trimmer head as shown in FIGS. 32 and 33 has three pairs of openings 124. The main housing is constructed of two spaced layers connected by a central hub. Each pair of openings are aligned vertically, one in each layer of the main housing, and constructed so that the assembled line-holding mechanism can be inserted from above. A bearing sleeve 115 must first be inserted into the lower level of the opening 124 in the main housing. Then the assembled line-holding mechanism 114 would be installed in the same opening. After the three line-holding mechanisms 114 are in place, cover 113 shown in FIG. 30 is placed over the main housing to hold the line-holding mechanisms in place. Cover 113 is fastened to the main housing 112 preferably using six screws 120, as shown in FIGS. 25-27.

The line-holding mechanisms are confined vertically between the bearing sleeves 115 and the cover 113, and are confined along their perimeters by the perimeter of each opening 124 in the housing 112. The line-holding mechanisms 114 are allowed to pivot about a vertical axis within the limits defined by the impingement of the vertical walls 150a and 150b shown in FIG. 49 against the stop 149 shown on the inside of cover 113 in FIG. 31. This limit to the rotation is not required for the functioning of the trimmer head, but assists in maintaining the pivot post in their preferred orientation, which is to have the exit holes 128a and 128b (shown in FIG. 49) pointing generally outward (away from the rotational center of the trimmer head).

Figure 29:
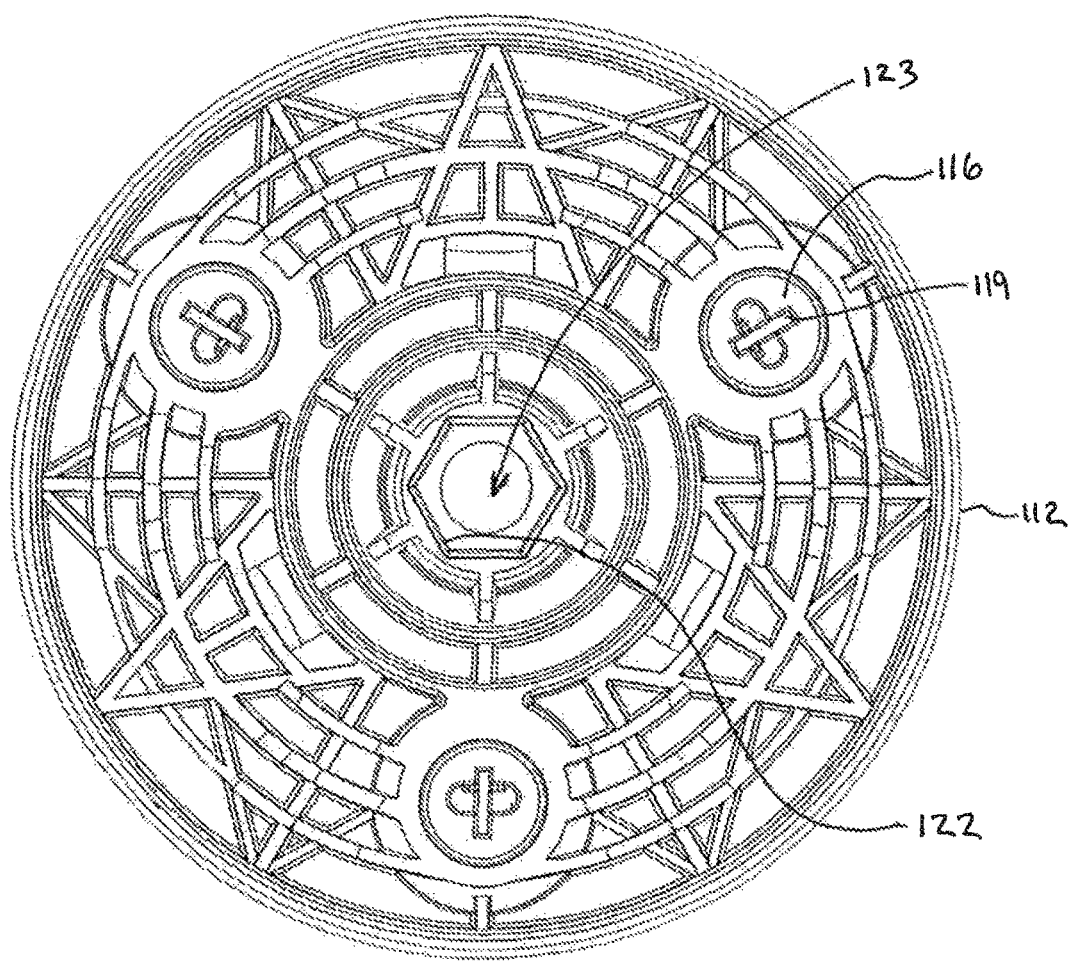
FIG. 29 is a bottom view of the embodiment shown in FIG. 25, with the ground contacting member removed.
Figure 30:
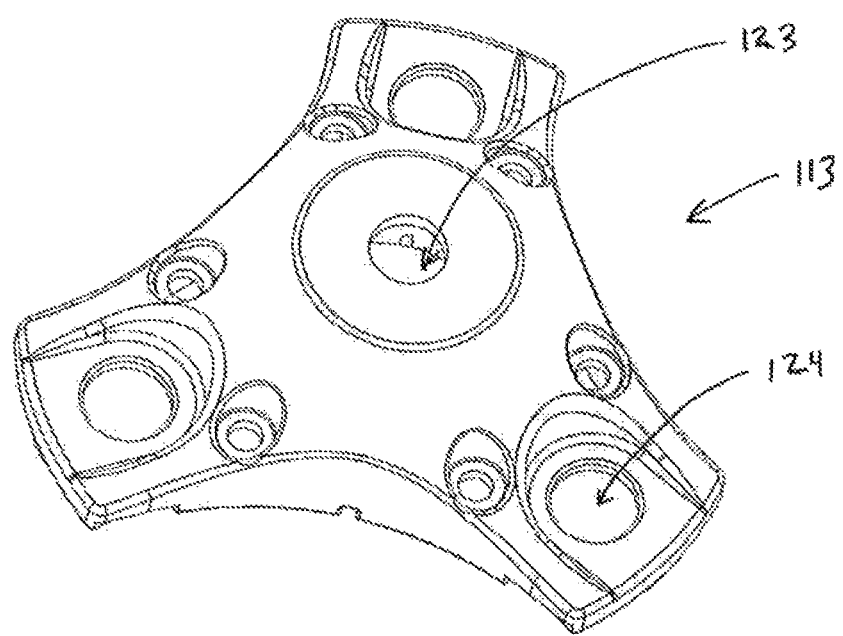
FIG. 30 is a top perspective view of the cover of the embodiment shown in FIG. 25.
Figure 31:
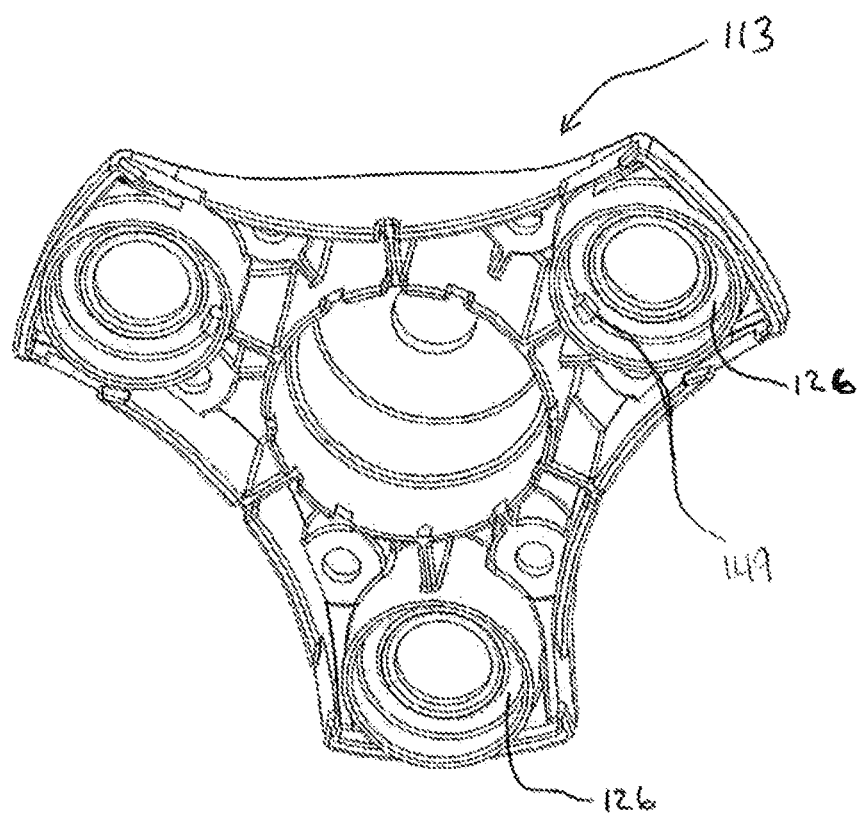
FIG. 31 is a bottom perspective view of the cover of the embodiment shown in FIG. 25.

Referring to FIG. 29, the trimmer head is attached to a trimmer machine by placing a fastener (not shown) with a hexagon head into the hexagon shaped cavity 122. Either the stem from the trimmer or the stem from a bolt would pass through the opening 123 shown in FIGS. 29-32. The head would then be rotated to turn the fastener, until the head was fully threaded onto the trimmer machine.

In FIG. 29, the ground contacting member 111 is not shown. It would be added after the assembled trimmer head is attached to the powered rotary machine (string trimmer or brush cutter machine). The ground contacting member 111 attaches to the main housing by pushing the three tabs 121 (see FIG. 28) through the three slots 127 (see figure FIG. 32). However, use of the ground contacting member is optional.

Figure 38:
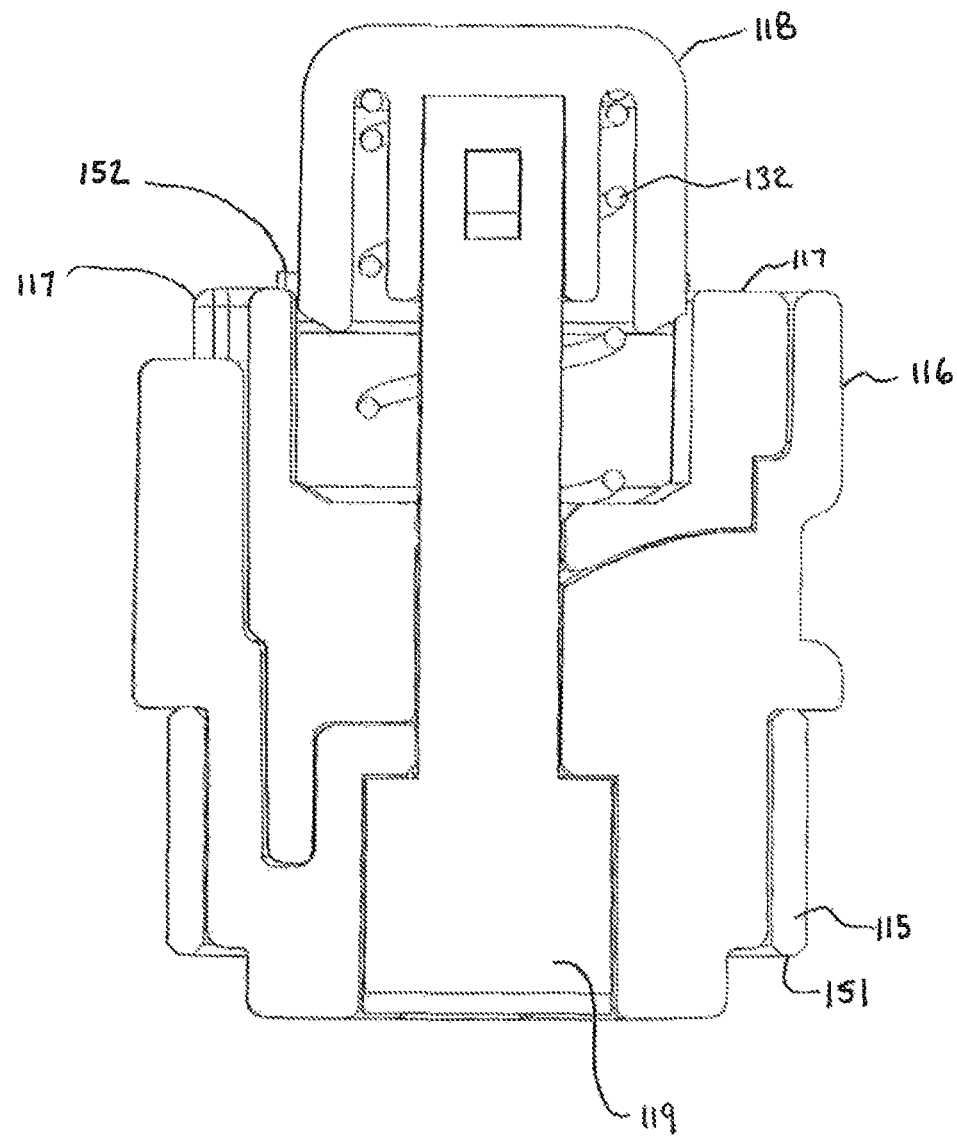
FIG. 38 is a cutaway of the line holding mechanism of the embodiment shown in FIG. 25.
Figure 39:
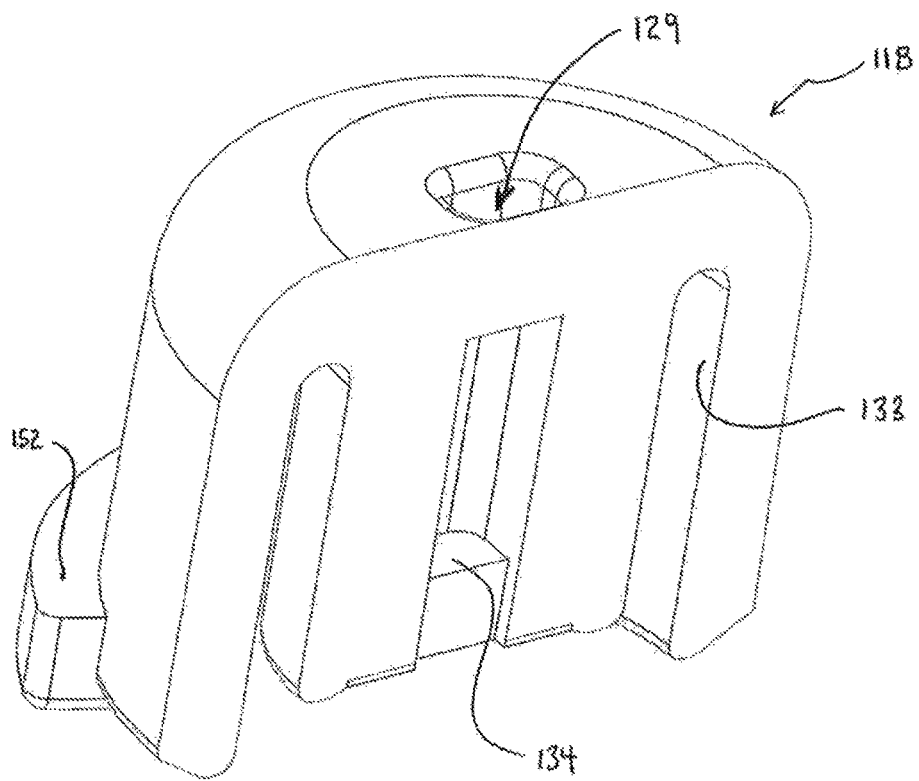
FIG. 39 is a side perspective cutaway view of the button of the embodiment shown in FIG. 25.
Figure 40:
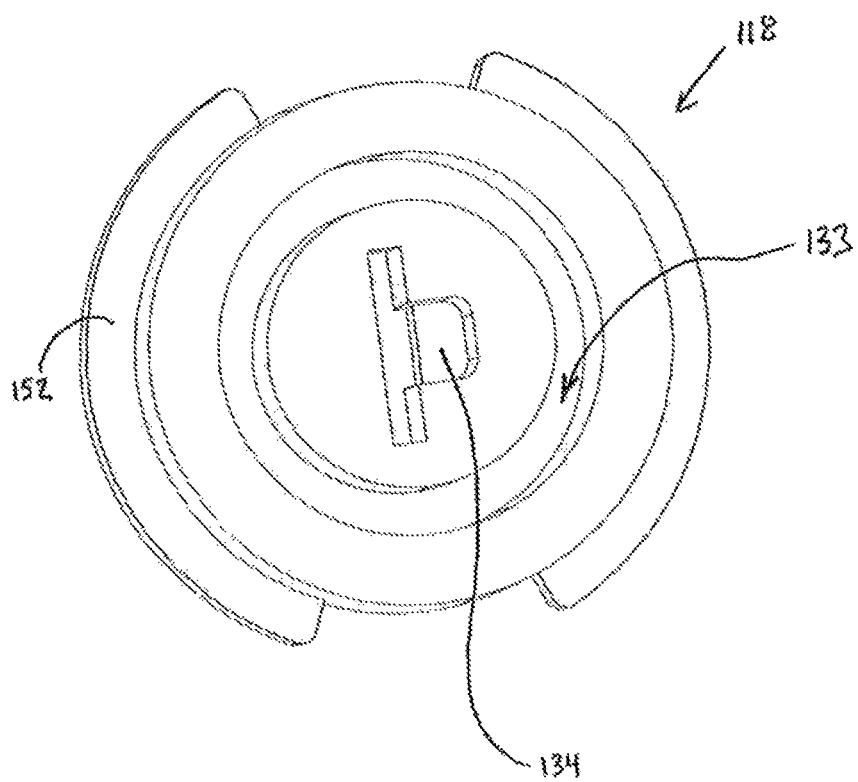
FIG. 40 is a top perspective cutaway view of the button of the embodiment shown in FIG. 1.
Figure 45:
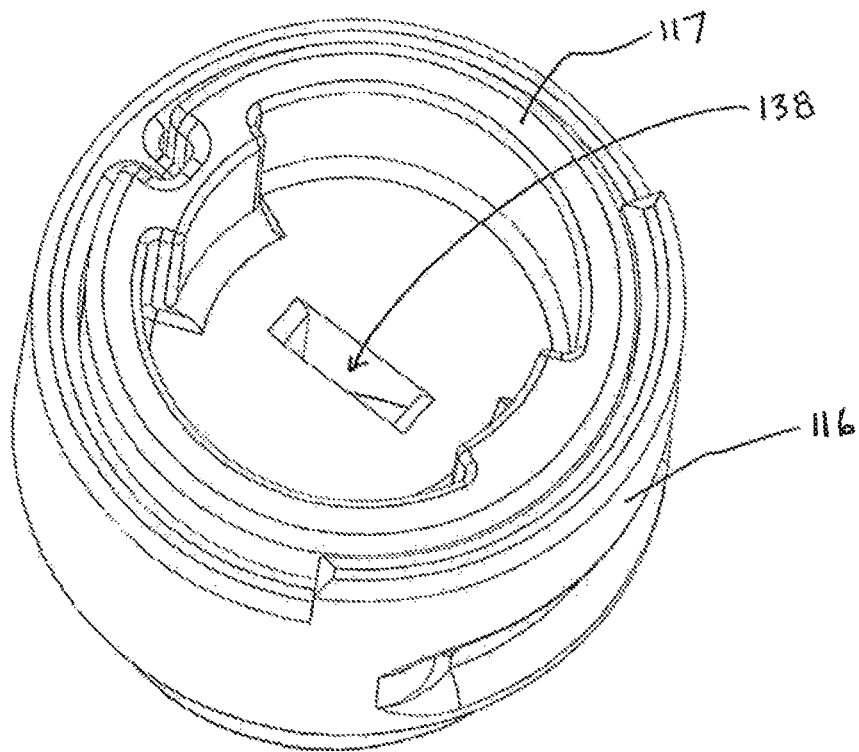
FIG. 45 is an upper perspective view of the upper and lower housings of the line holding mechanism of the embodiment shown in FIG. 25, assembled.
Figure 46:
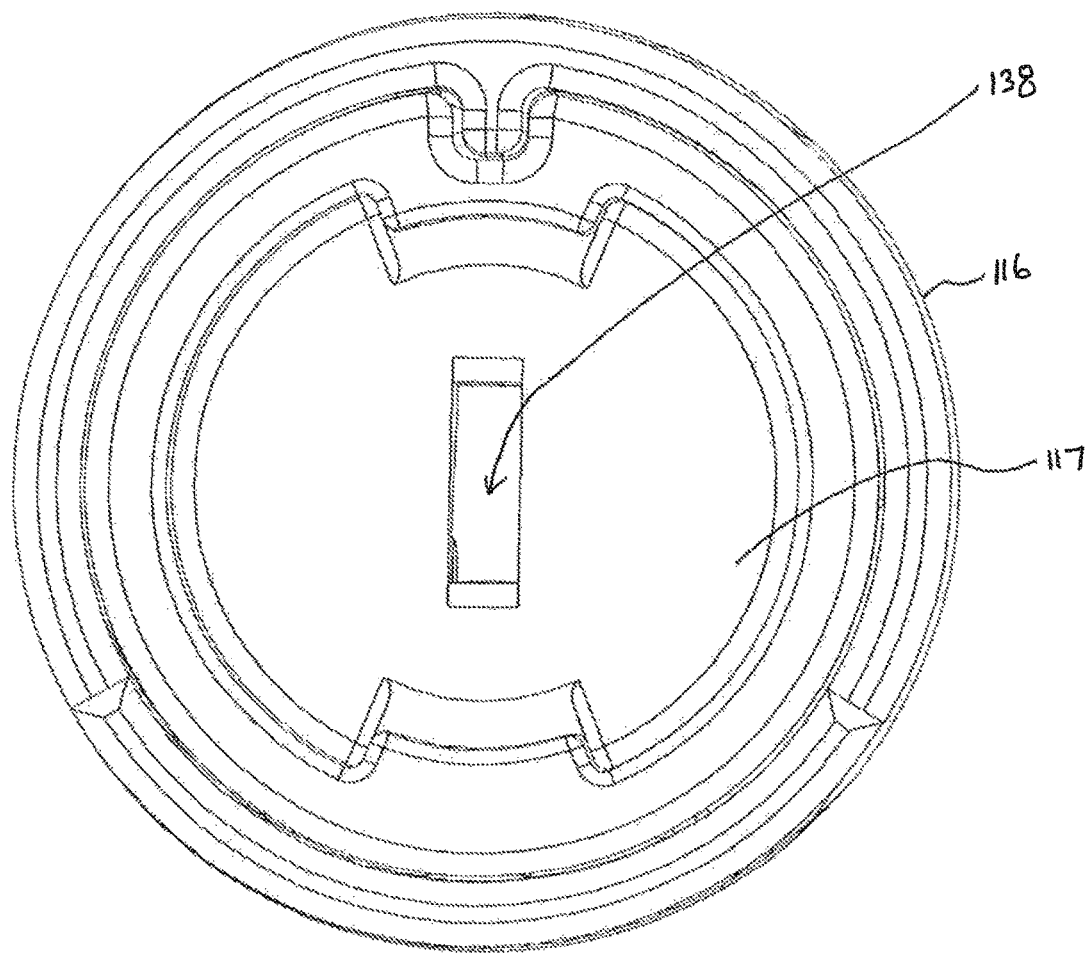
FIG. 46 is a top view of the upper and lower housings of the line holding mechanism of the embodiment shown in FIG. 25, assembled.
Figure 47:
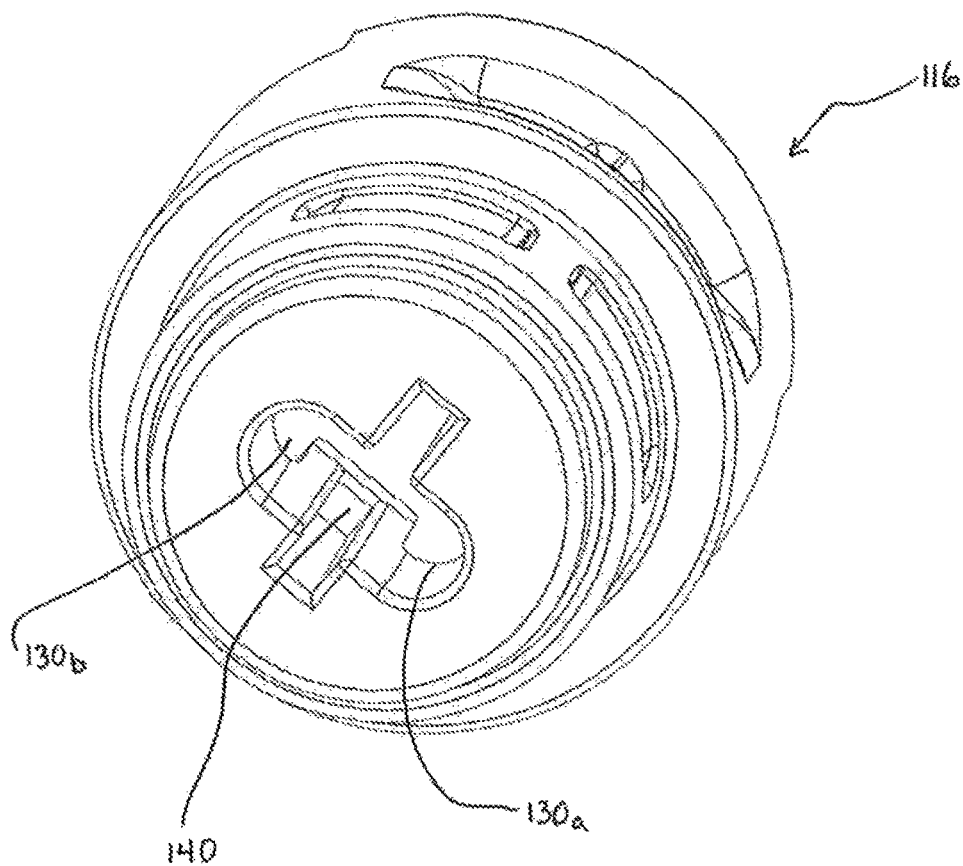
FIG. 47 is a bottom perspective view of the lower housing of the line holding mechanism of the embodiment shown in FIG. 25.
Figure 48:
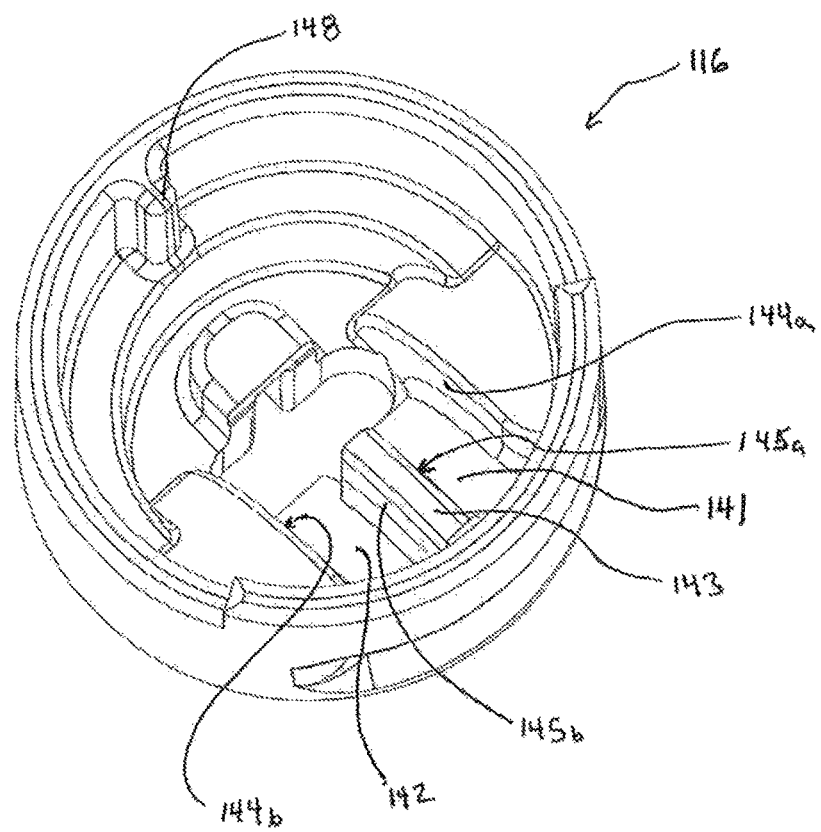
FIG. 48 is a top perspective view of the lower housing of the line holding mechanism of the embodiment shown in FIG. 25.
Figure 49:
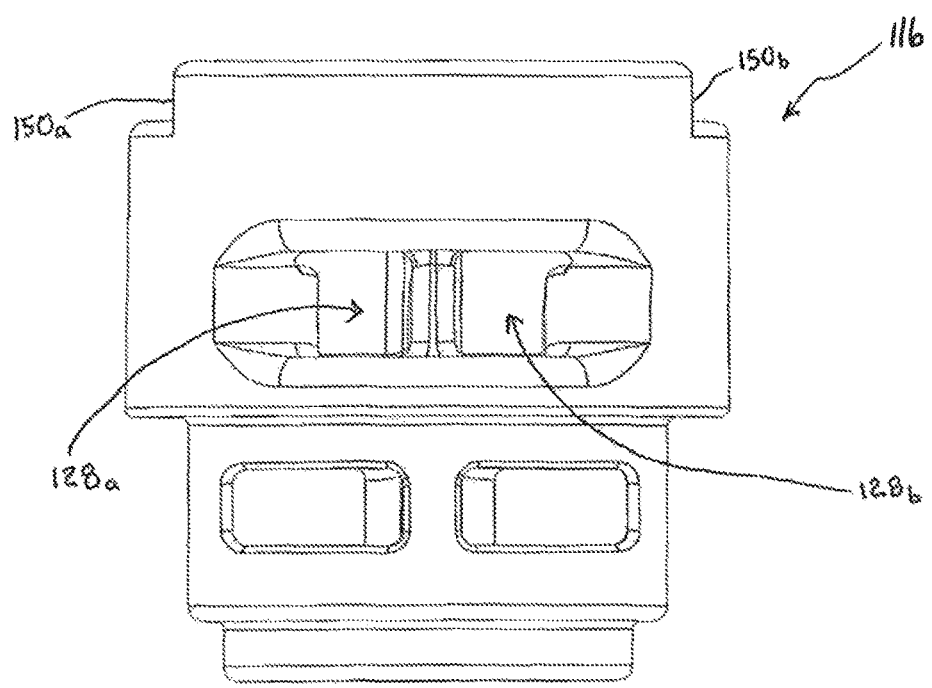
FIG. 49 is a side view of the lower housing of the line holding mechanism of the embodiment shown in FIG. 25.
Figure 50:
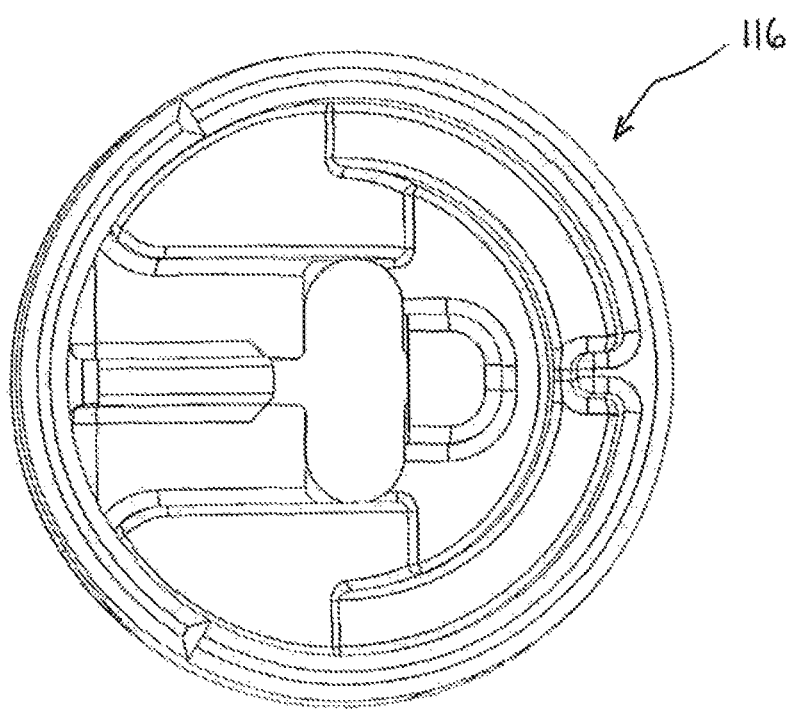
FIG. 50 is a top view of the lower housing of the line holding mechanism of the embodiment shown in FIG. 25.
Figure 51:
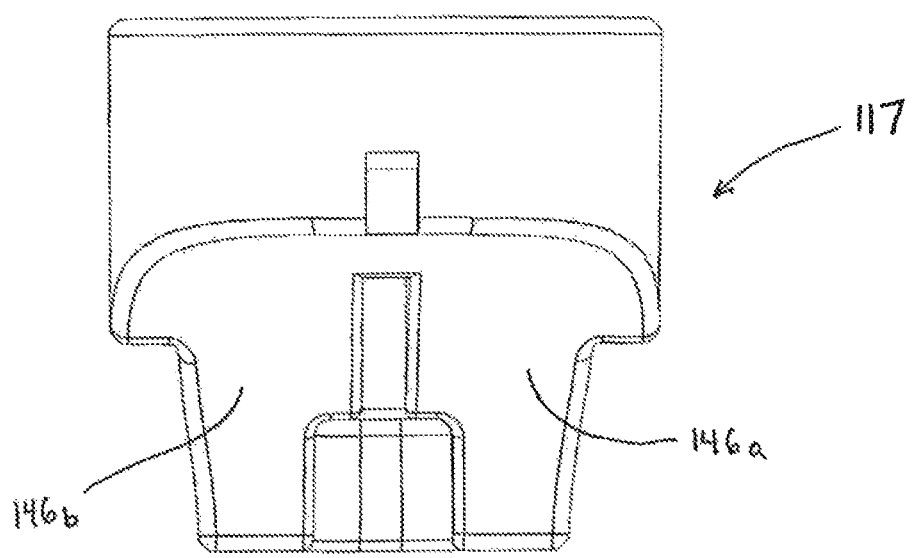
FIG. 51 is a side view of the upper housing of the line holding mechanism of the embodiment shown in FIG. 25.
Figure 52:
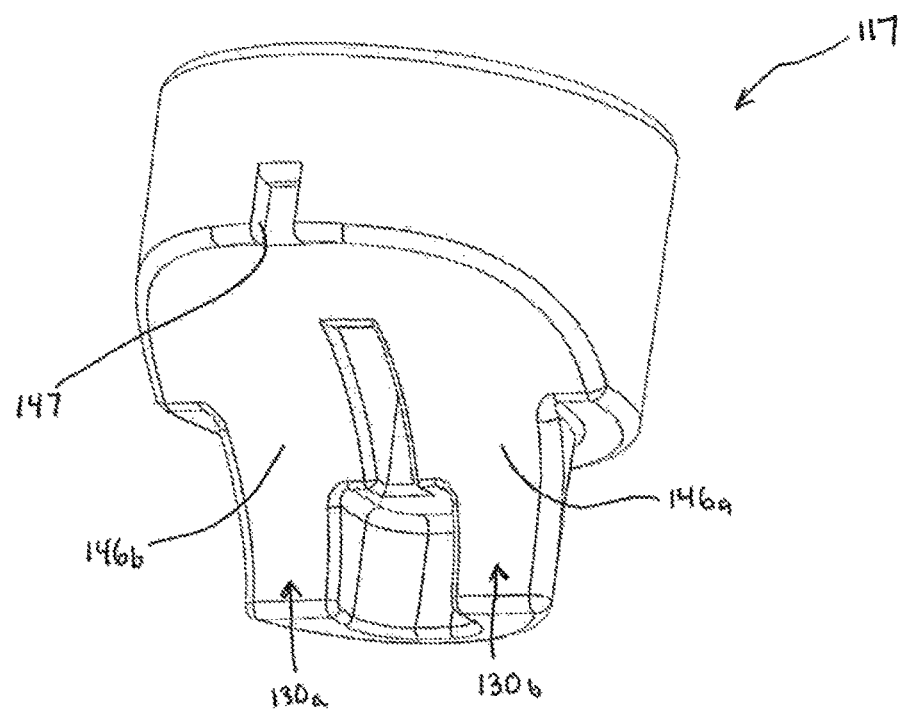
FIG. 52 is a side perspective view of the upper housing of the line holding mechanism of the embodiment shown in FIG. 25.
Figure 53:
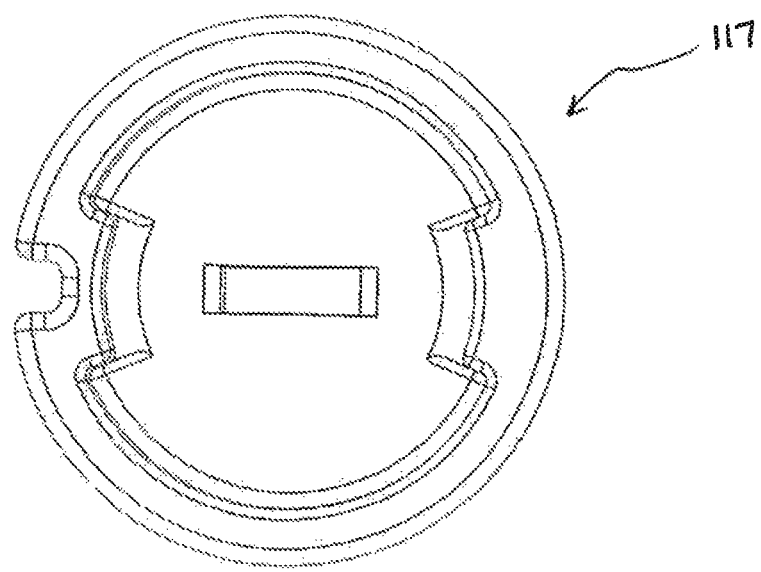
FIG. 53 is a top view of the upper housing of the line holding mechanism of the embodiment shown in FIG. 25.
Figure 54:
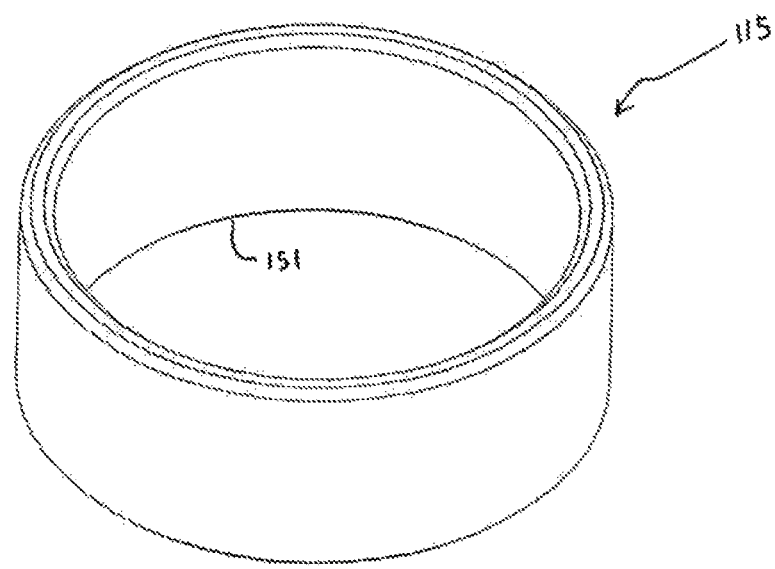
FIG. 54 shows a typical bearing sleeve used in the embodiment shown in FIG. 25.

Each of the pivoting line-holding mechanisms 114 are preferably assembled using five pieces, excluding the bearing sleeve 115 shown in FIGS. 38 and 54. The upper housing 117 for the line holding mechanism is shown separately in FIGS. 51-53. This is placed over the lower housing 116, shown separately in various views in FIGS. 47-50. The upper housing 117 and lower housing 116 as assembled are shown in FIGS. 45 and 46. The interior surfaces of the upper and lower housings are shaped such that when combined, each pair creates a passageway for holding a folded strip of line. At the upper end of this line passageway, the two line channels are separated by rib 143 shown in FIG. 48. At the lower end of this passageway, separation of the two legs of the folded line strip is separated by the blade 119 to be discussed later. Without this blade, there is no separation of the two legs of the folded line strip. One advantage of this multi-piece construction of the line channels is that the line channels are not restricted to being parallel. The line channels are curvilinear, allowing the line to be loaded at a ninety degree angle from the exit position. However, the design is not restricted to a ninety degree orientation. The angle formed by the line portion entering the pivoting assembly relative to the line portion existing the pivoting assembly could be greater or less than ninety degrees.

Figure 36:
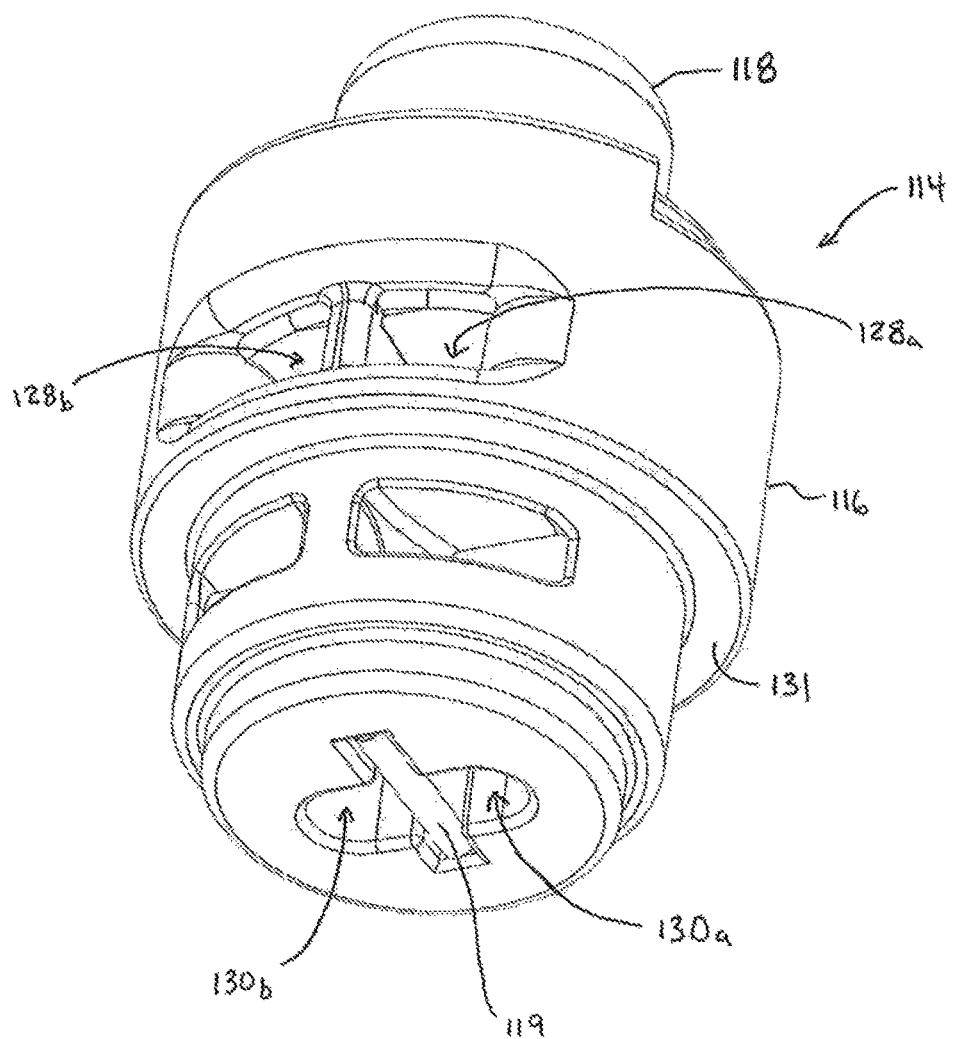
FIG. 36 is a bottom perspective view of the line holding mechanism of the embodiment shown in FIG. 25.
Figure 37:
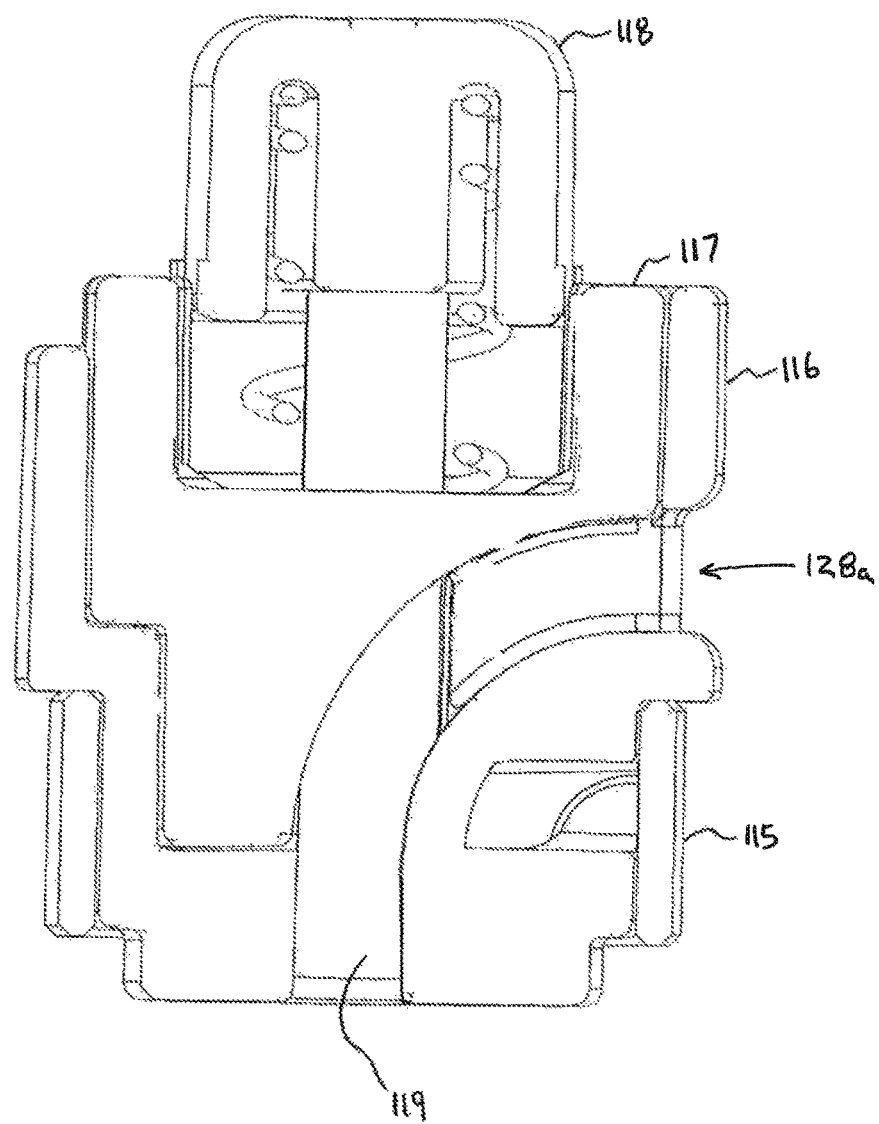
FIG. 37 is a cutaway view of the line holding mechanism and bearing sleeve of the embodiment shown in FIG. 25 with the spring removed.
Figure 70:
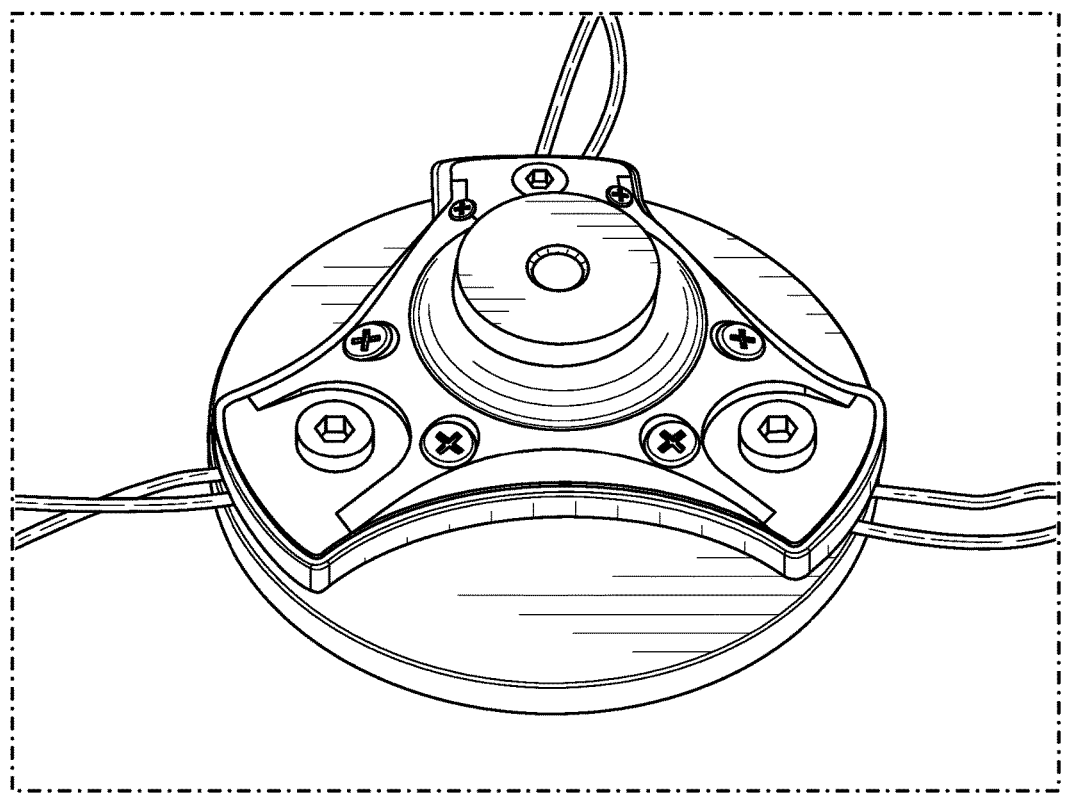
FIG. 70 shows a perspective of a preferred embodiment of the present invention.
Figure 71:
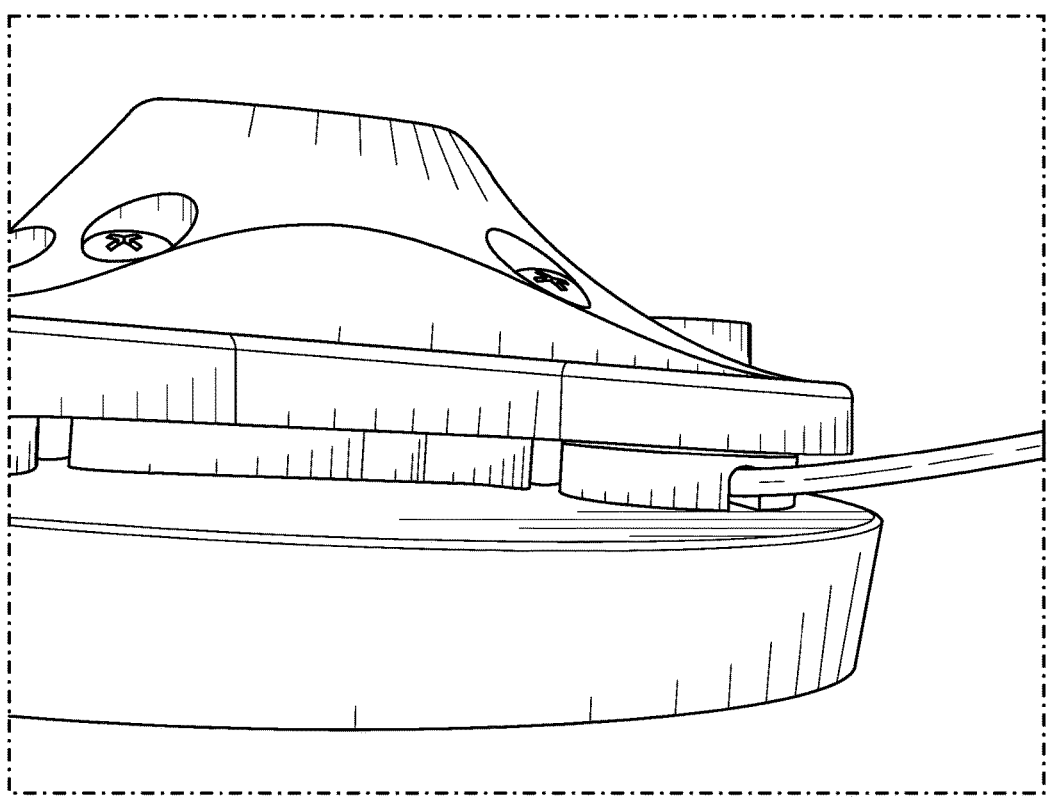
FIG. 71 shows a side view of the embodiment shown in FIG. 70 with trimmer line extending from the line-holding mechanism.
Figure 72:
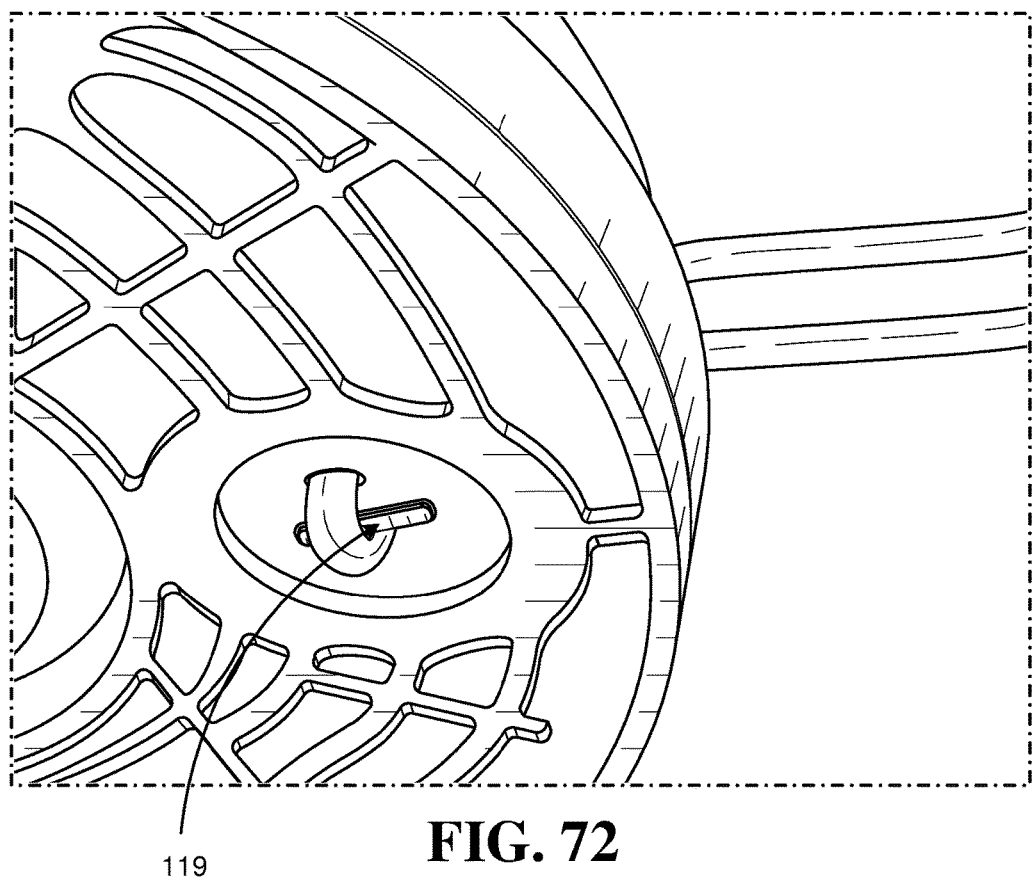
FIG. 72 shows a bottom view of the embodiment shown in FIG. 70 with the trimmer line installed.

Each pivoting line-holding mechanism is designed to hold one folded strip of line (see FIGS. 70-74). Referring to FIG. 36, the two distal ends of line are inserted into the openings 130a and 130b. The trimmer line ends are pushed into the line channels discussed above which are formed between the upper 117 and lower 116 housings. The line ends will follow the curvilinear path and will exit the line-holding mechanism 114 at channels 128a and 128b. The user would continue to push the line into the channel, or would pull the free ends of the trimmer line until the folded strip of line is fully inserted. FIGS. 70-72 show the line installed. This process would be repeated until a folded strip of trimmer line is installed into each of the three line-holding mechanisms for this embodiment.

When the user of the embodiment powers the trimmer machine, the distal ends of the folded strip of line will extend radially outward due to the centrifugal force caused by the rotation of the trimmer head. Due to the high spin rate the tips of the trimmer line are capable of cutting vegetation. However, if the tips of the trimmer line were to impact an immovable object such as a metal pole or rock, then the line-holding mechanism can pivot, allowing the trimmer line to momentarily move out of the way. The advantage of this pivoting action is that the line is less apt to break due to impacting an immovable object. The centrifugal force created by the rotational spinning of the trimmer head would cause the trimmer line to rotate the line-holding assemblies such that the line is again extending radially outward. This action of the line pivoting out of the way from an immovable object and then pivoting back to a radial position occurs repetitively until the trimmer line is clear of the immovable object.

Figure 73:
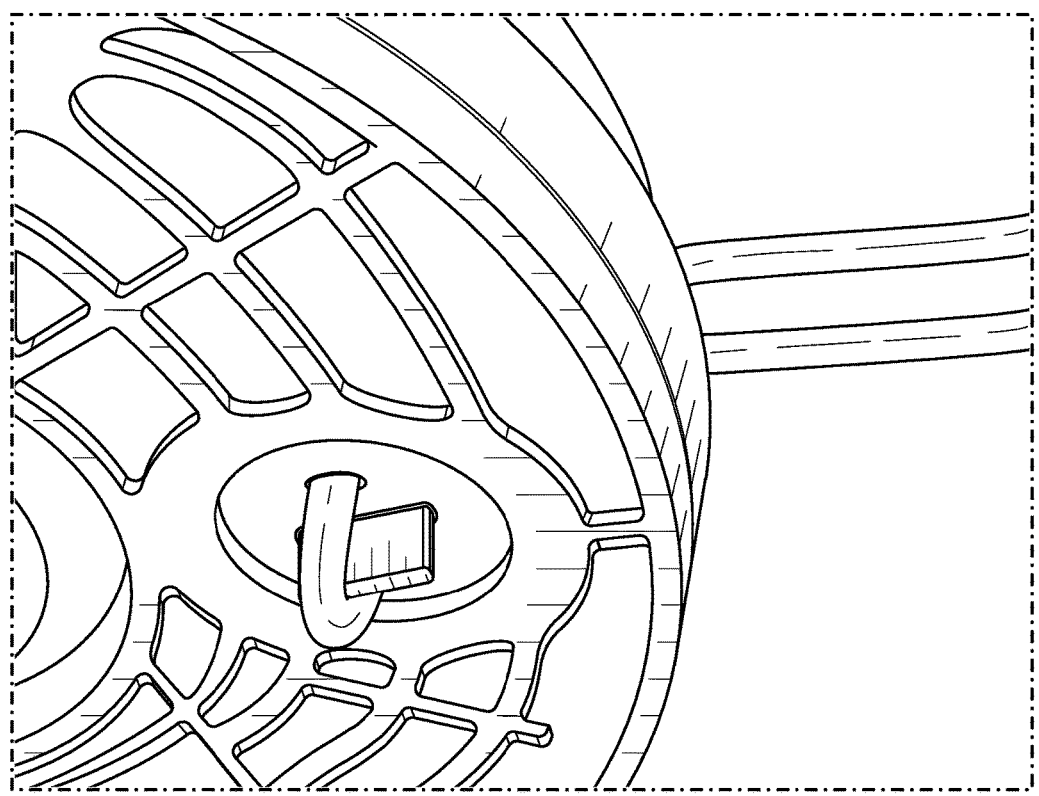
FIG. 73 shows the trimmer line pushed out from the trimmer head after the user has activated the button.
Figure 74:
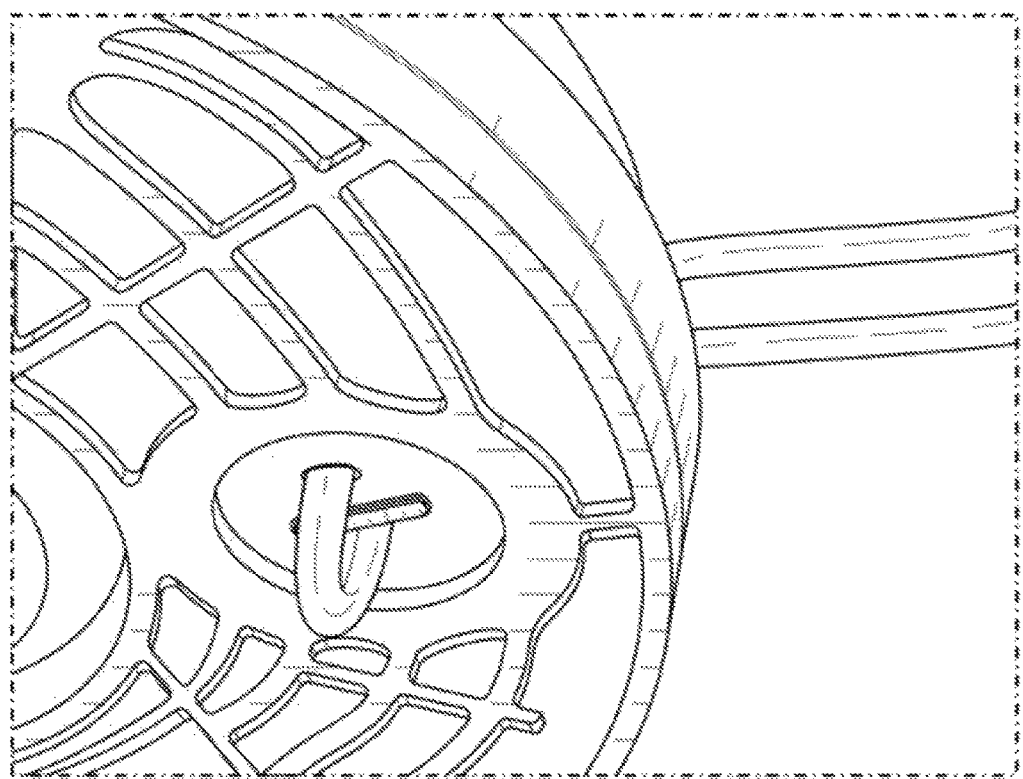
FIG. 74 shows the button released, and the loop of trimmer line that can be pinched and pulled out of the head by the user.

Even with the advantages of the pivoting action to minimize line breakage, there is still the issue that the line will naturally wear over time from use and will need to be replaced. Removal of the used strip of trimmer line can be difficult, more so the shorter the remaining amount of line extending from exit channels 128a and 128b is. To solve this problem, the embodiment shown in FIGS. 25-55 of the present invention comprises a trimmer head wherein the line-holding mechanism 114 comprises a spring-loaded, button activated blade 119 (see FIG. 38) that allows the user a means to push the used strip of line partially out of the line-holding mechanism. FIGS. 72-74 show this action. FIG. 72 shows the line strip installed with the blade 119 in the up position. FIG. 73 shows the blade in the down position. To move the blade into the downward position, the user must push button 118, which in turn compresses spring 132 and moves blade 119 into the lower position. Then the user can release the button. Upon doing so, the spring will bias the blade back into the up position. This will leave a loop of line extending from the lower surface of the line-holding mechanism. This loop of line can then easily be pinched and pulled to remove the used strip of line. The incorporation of the spring-loaded, button activated blade in the pivoting line-holding mechanism provides the consumer with a novel product and a novel method for removing a used folded strip of trimmer line without the use of tools.

Figure 42:
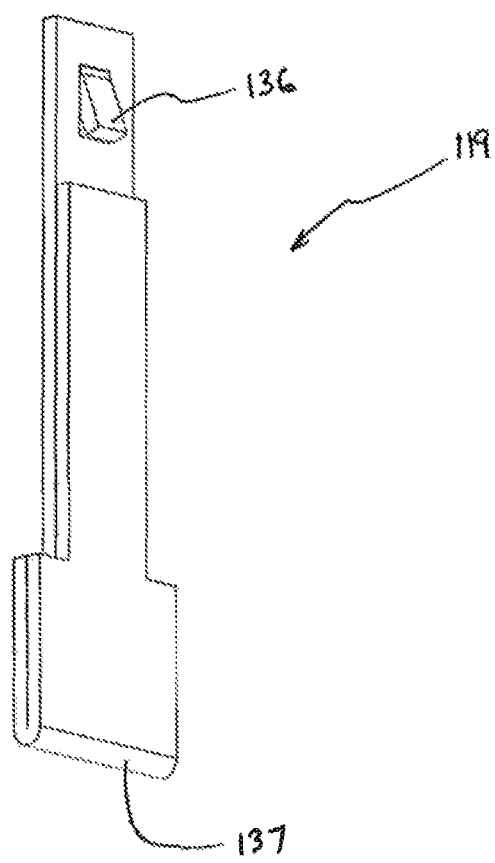
FIG. 42 is a perspective view of a first side of the blade of the embodiment shown in FIG. 25.
Figure 43:
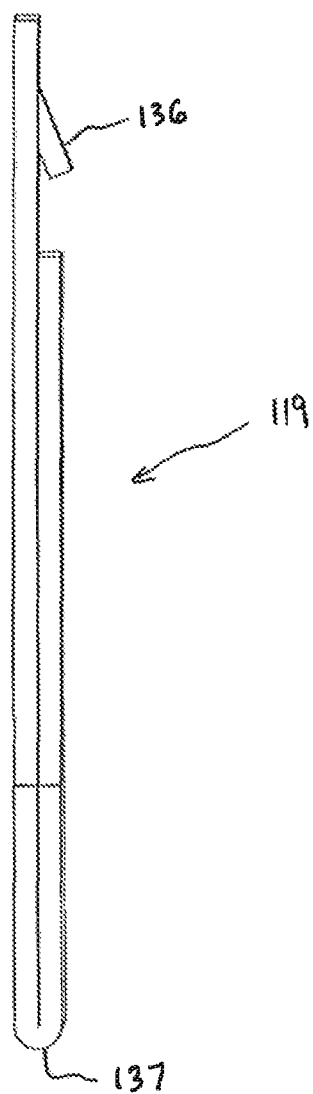
FIG. 43 is a side view of the blade of the embodiment shown in FIG. 25.
Figure 44:
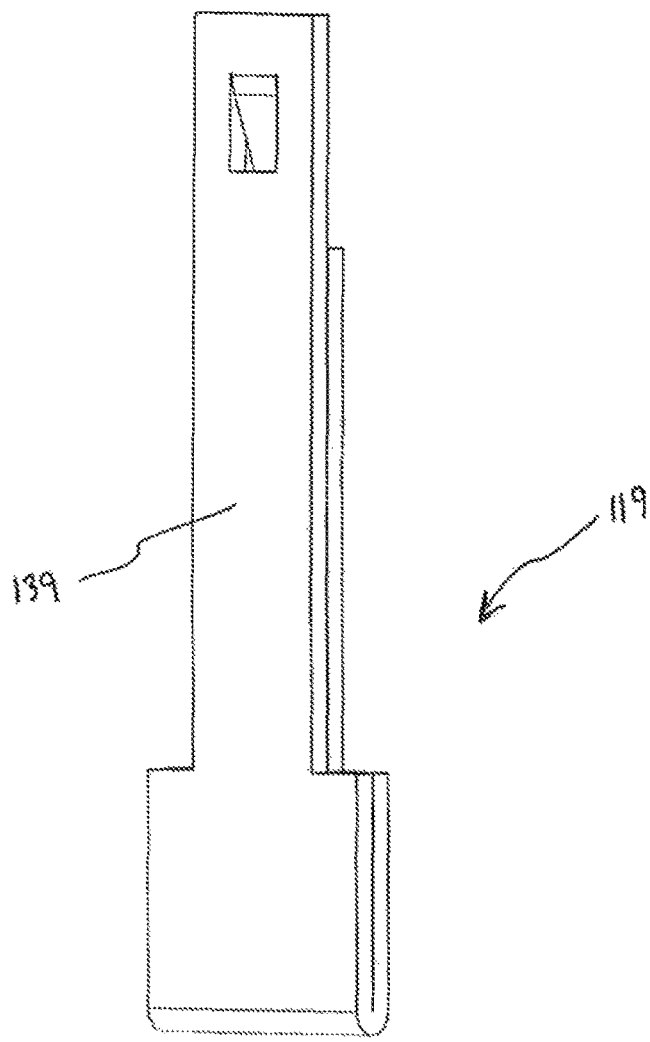
FIG. 44 is a perspective view of a second side of the blade of the embodiment shown in FIG. 25.

Referring to FIGS. 42-44, blade 119 is preferably formed from a folded strip of metal. The folding action provides a nice radius 137 at the bottom of the blade for pushing against the folded strip of line. However, blade 119 could also be formed using a die casting process, or machined from metal using several commercial processes. It could also be molded of plastic.

The lower end of the blade could be a blunt square tip or other shape, but the rounded lower end is preferred. Additionally, the main shaft of the blade could be constructed differently. For example, a cylindrical shape could also be used. The upper end could also be fastened to the button using other means, such as a head placed on the upper end and pressed into a cavity of the button. Insert molding could also be used to attach the button to the blade shaft.

At the upper end of the blade 119 is projection 136. To assemble the blade 119 to the button 118, the upper end of the blade is inserted into the channel 135 (see FIG. 41) of the button. The blade upper end is to be oriented such that its projection 136 will catch upon the ledge 134 once inserted. Ledge 134 (see FIGS. 39 and 40) will keep the blade 119 from being removed from the button. Prior to inserting the upper end of blade 119 into the button 118, the spring 132 must be installed into the circular slot 133 shown in FIG. 39. The cutaway in FIG. 38 shows the proper placement of the spring 132 in the line-holding mechanism 114.

Figure 41:
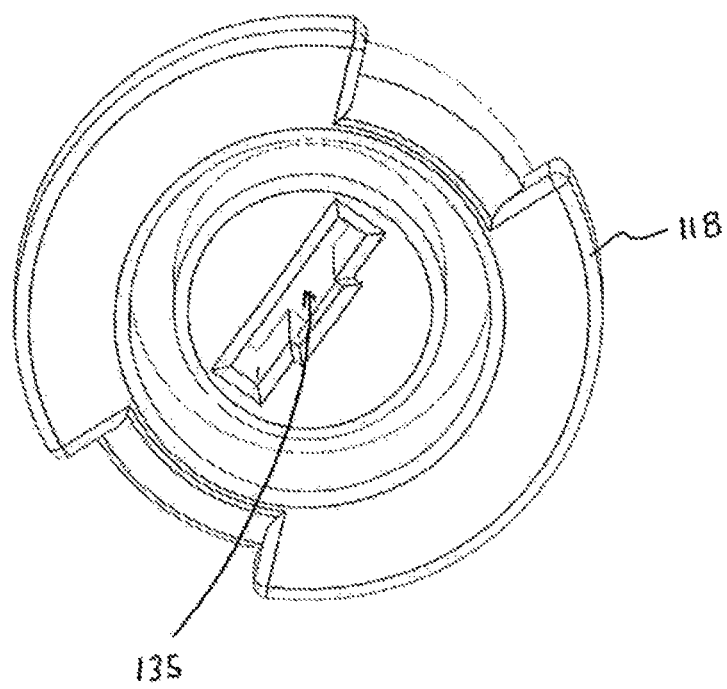
FIG. 41 is a bottom perspective cutaway view of the button of the embodiment shown in FIG. 25.

Referring to FIG. 38, the subassembly of the spring 132, button 118 and the blade 119 are not locked into the lower housing 116. As can be seen in FIG. 46, there is a passageway 138 which is open all the way through both the upper housing 117 and the lower housing 116. To assemble the pivoting line-holding mechanism, the upper end of the blade 119 is pushed first through the opening 138 as in the lower housing 116, then through the opening 38 in the upper housing 117 (FIG. 45), then through the center of the spring 132, and finally into the opening 135 in the button (FIG. 41). The blade is pushed until the blade hook 136 catches on the ledge 134 shown in FIG. 40. Once the blade hook catches on ledge 134, then the assembly cannot be taken apart. There is a stop 140 on the inside bottom of the lower housing 116 (FIG. 47) which limits the upward movement of blade 119.

Figure 55:
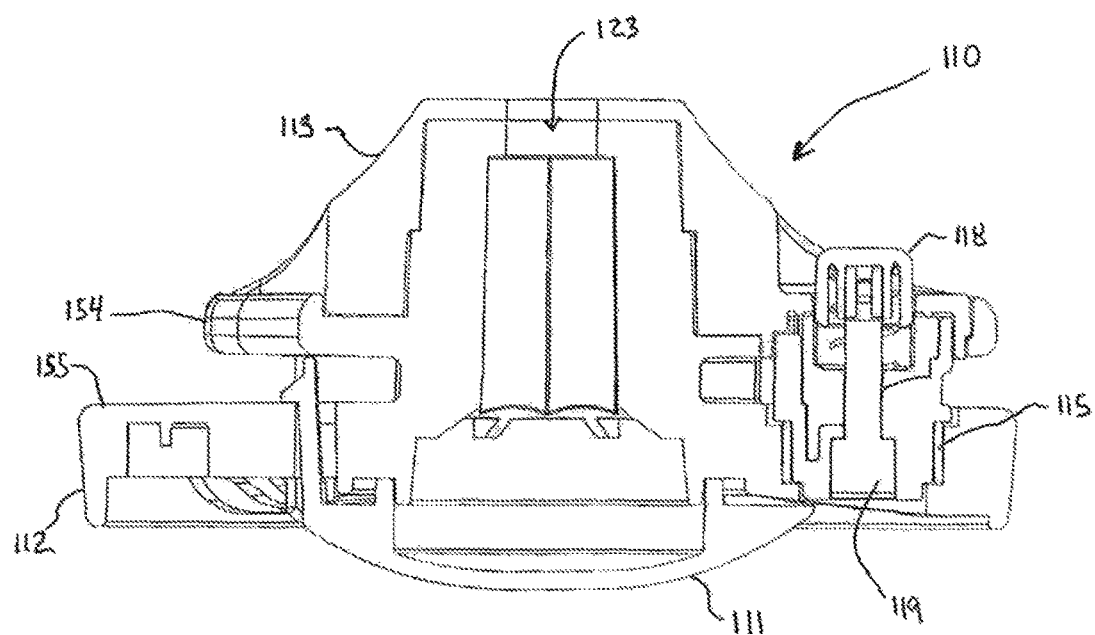
FIG. 55 is a cross-sectional cutaway view of the embodiment shown in FIG. 25.
Figure 56:
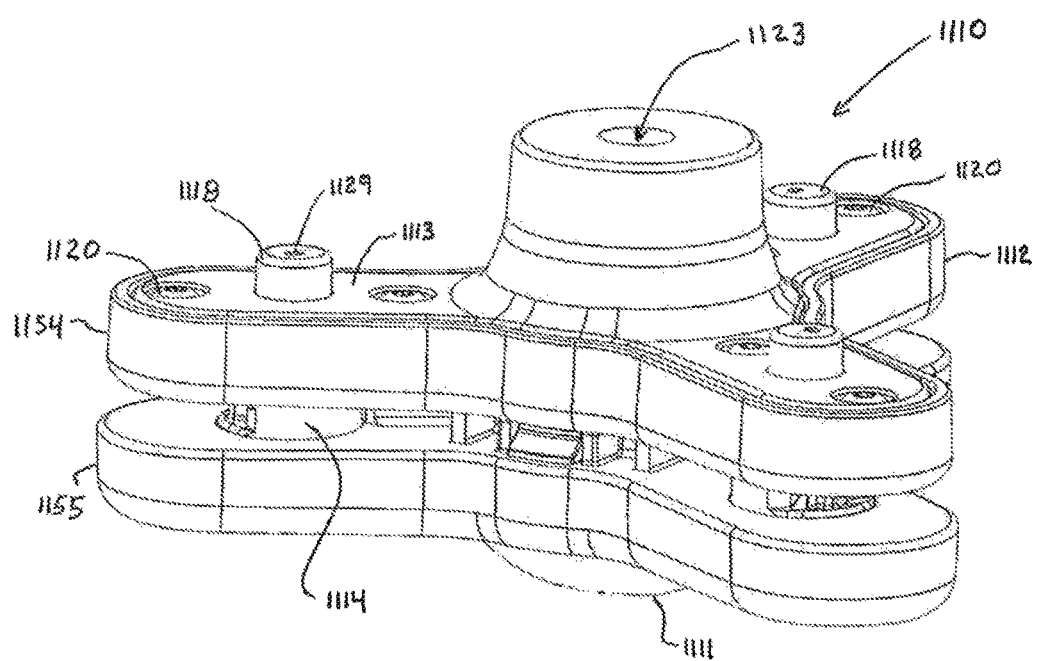
FIG. 56 is a side perspective view of a third embodiment of the present invention.
Figure 57:
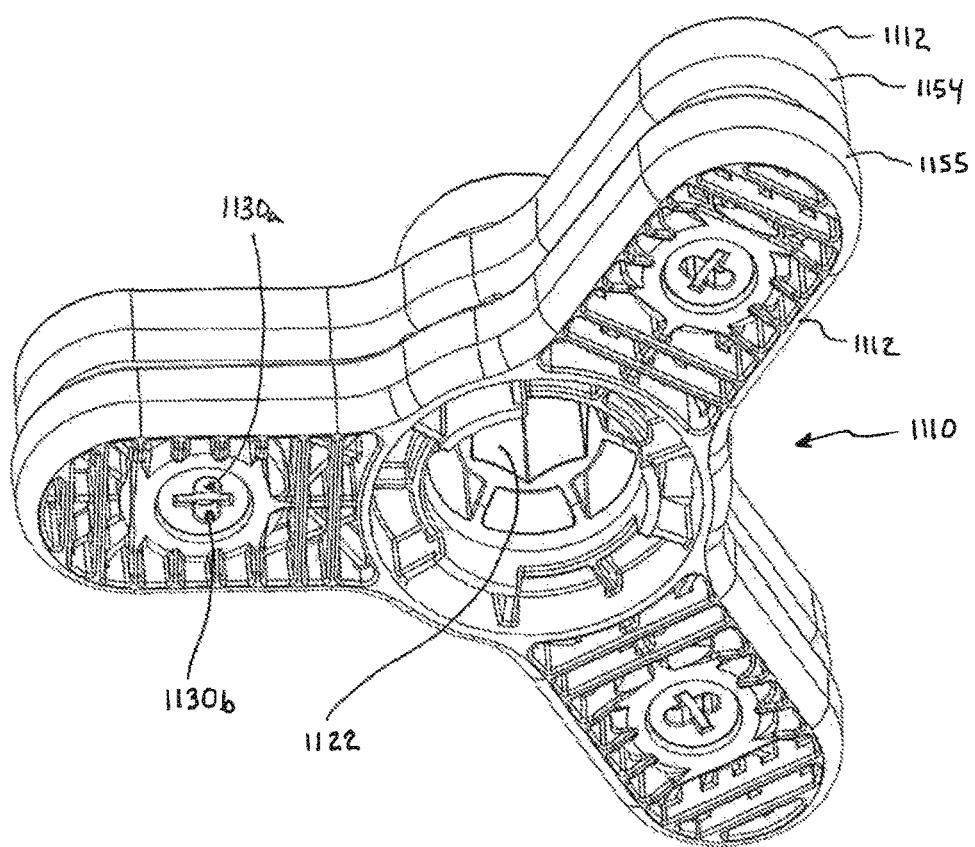
FIG. 57 is a bottom perspective view of the embodiment shown in FIG. 56 with the ground contacting member removed.
Figure 58:
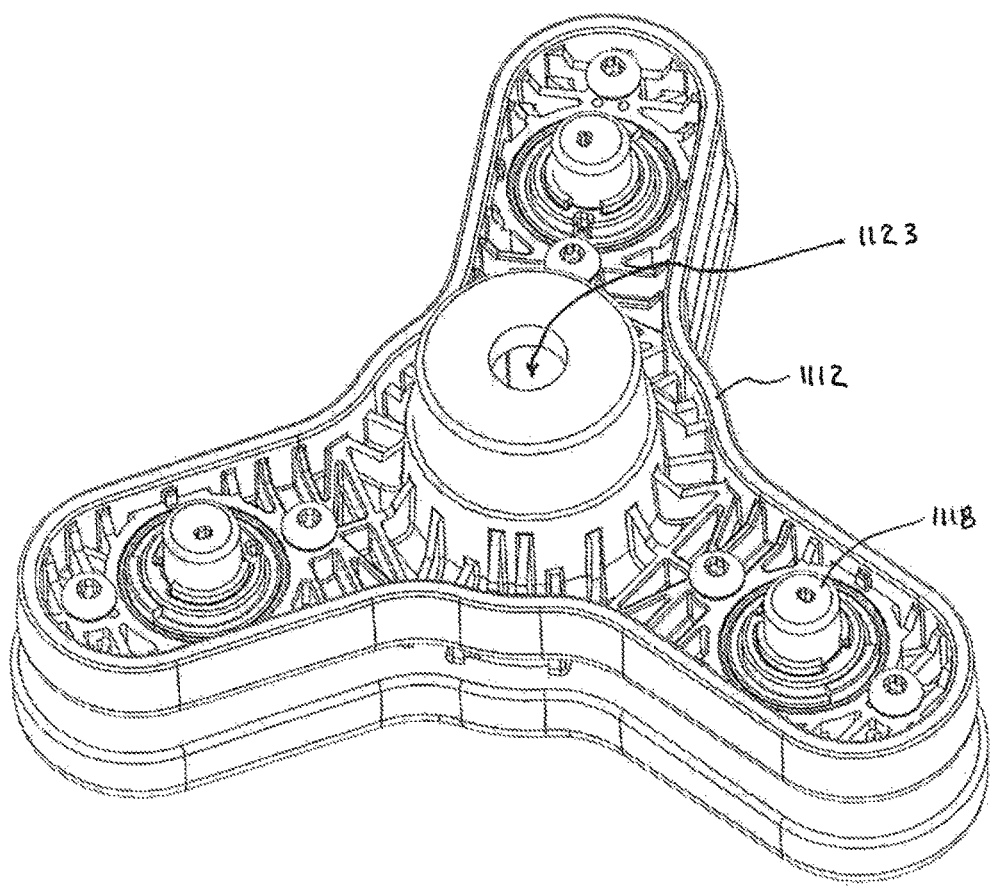
FIG. 58 is a top perspective view of the embodiment shown in FIG. 56 with the cover removed.
Figure 59:
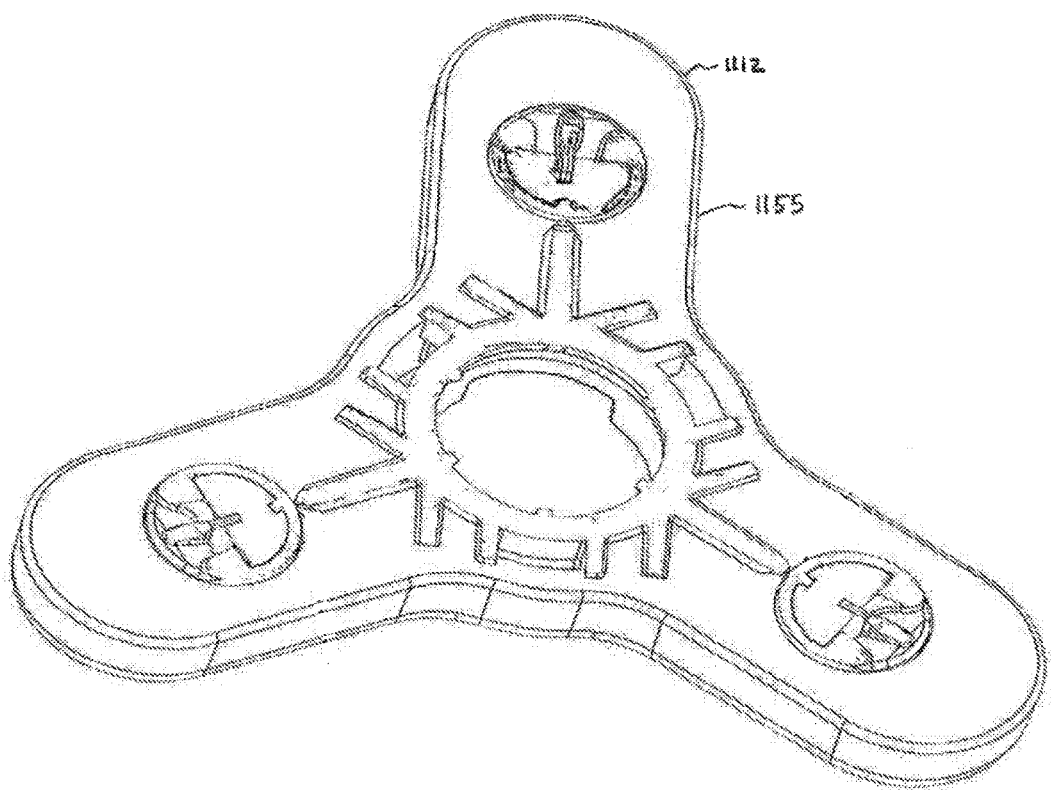
FIG. 59 is a sliced view of the embodiment shown in FIG. 56 shown without the ground contacting member, taken between the two main layers of the main housing.
Figure 60:
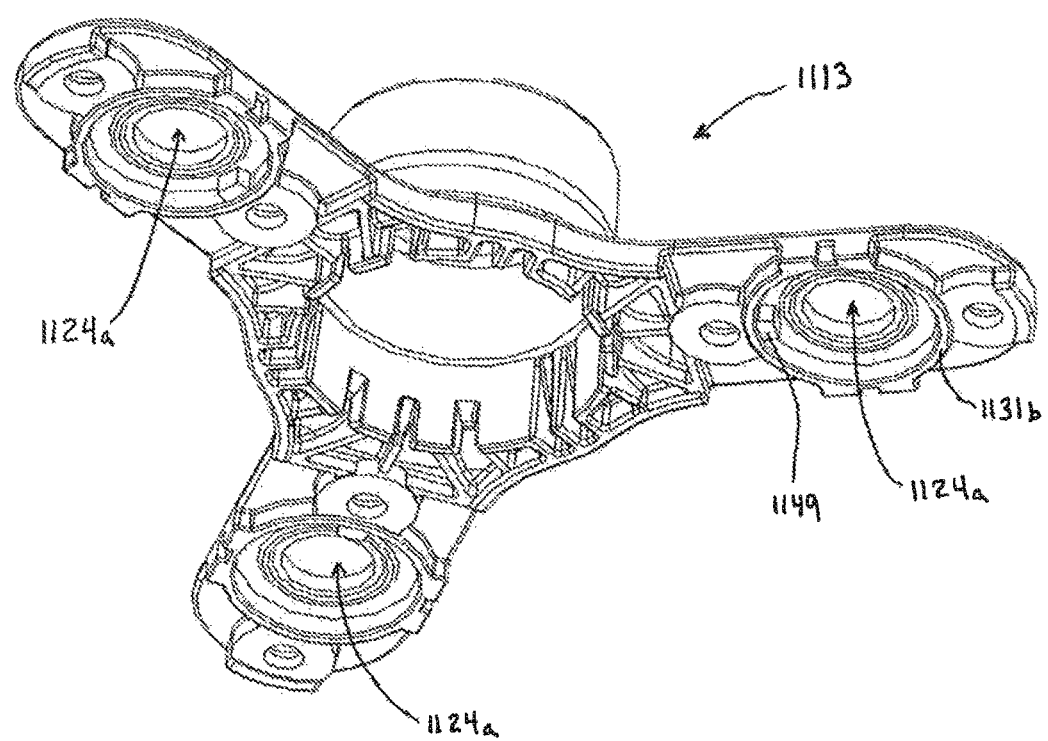
FIG. 60 is a bottom view of the cover of the embodiment shown in FIG. 56.
Figure 61:
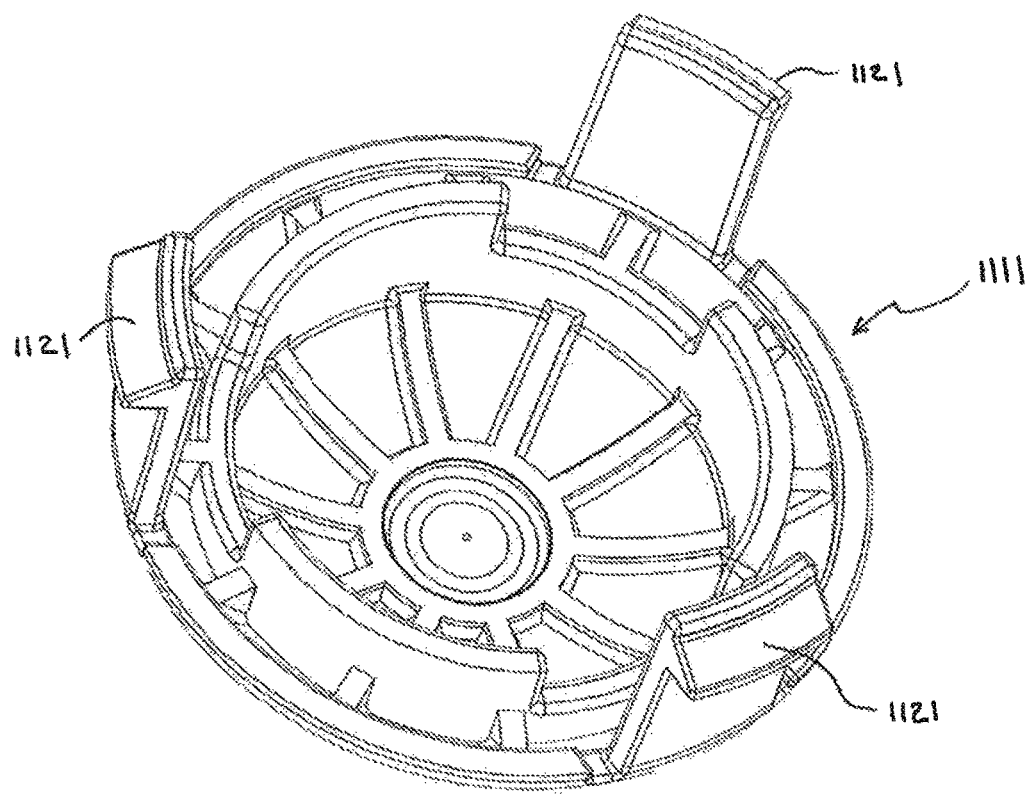
FIG. 61 is an inside perspective view of the ground contacting member of the embodiment shown in FIG. 56.
Figure 62:
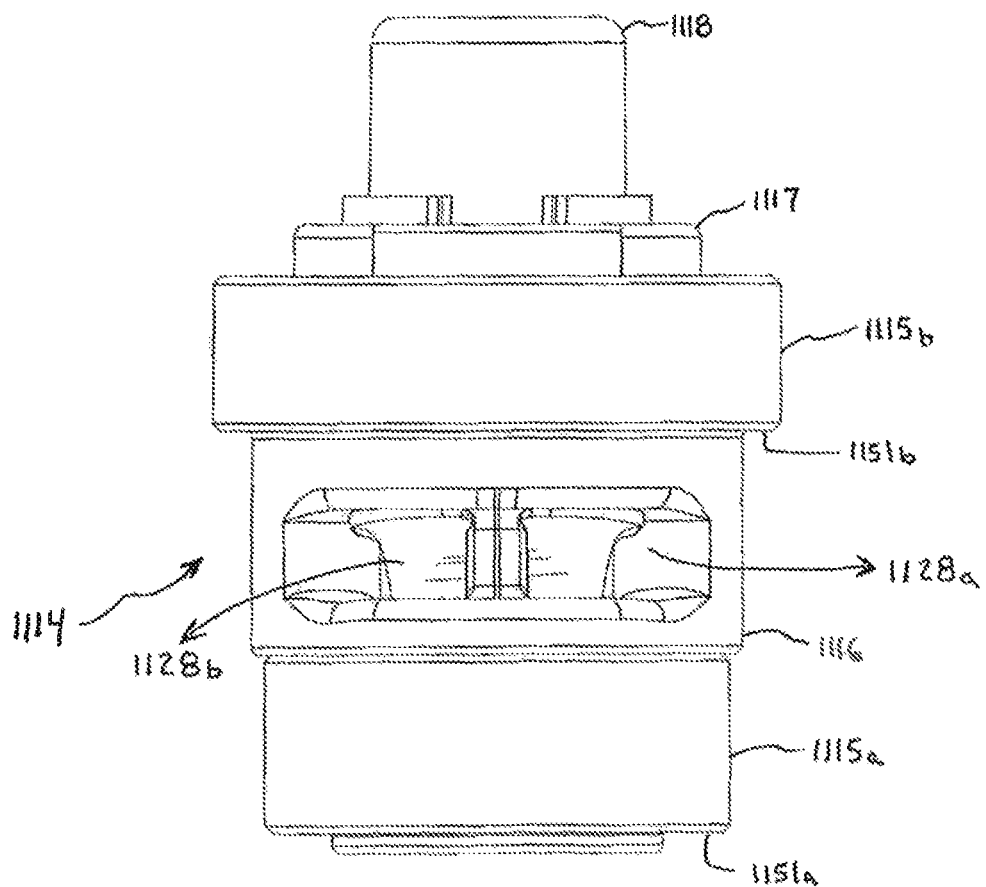
FIG. 62 is a side perspective view of the line-holding mechanism of the embodiment shown in FIG. 56 with two bearing sleeves.
Figure 63:
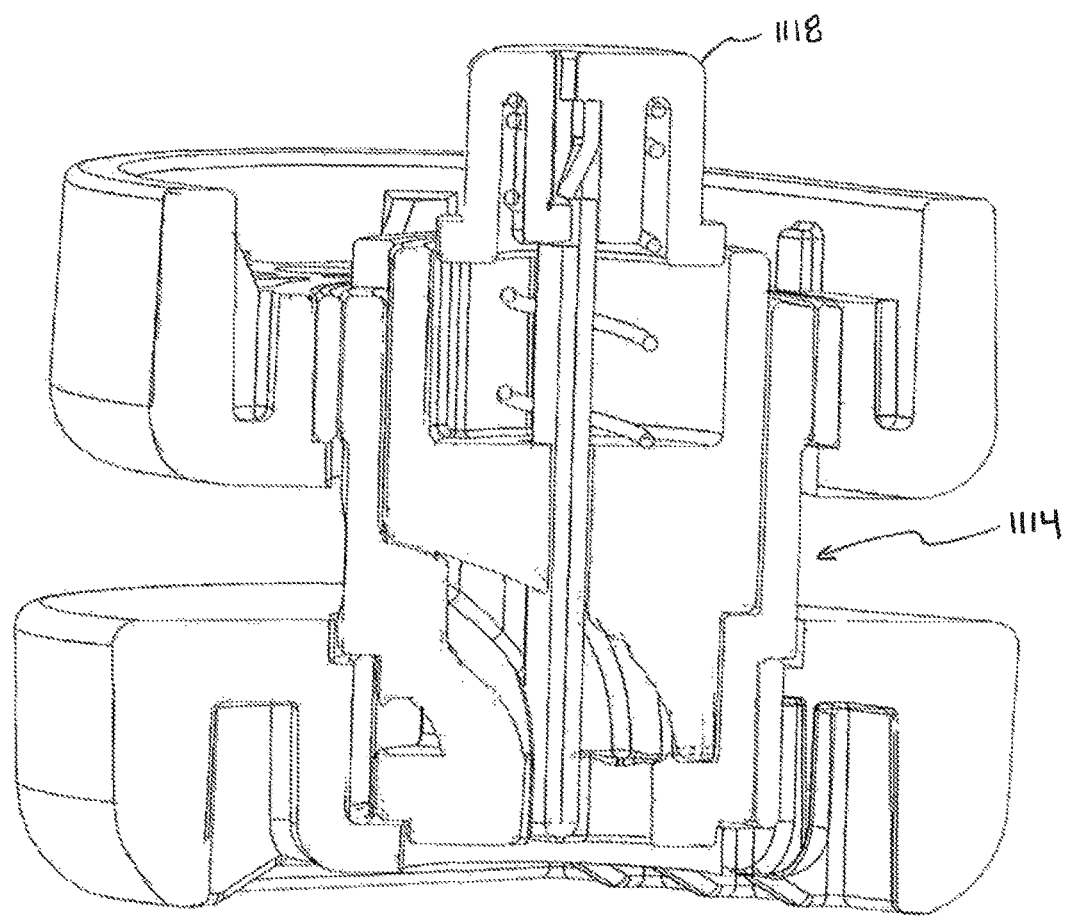
FIG. 63 is a cutaway view through the main housing, line holding mechanism and bearing sleeves of the embodiment shown in FIG. 56.
Figure 64:
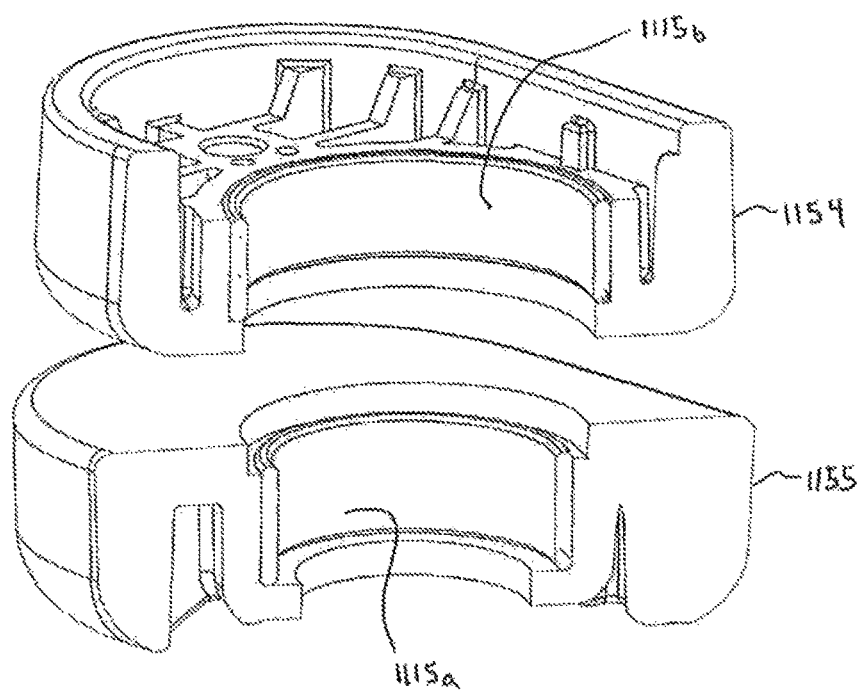
FIG. 64 is a cutaway view through the main housing, line holding mechanism and bearing sleeves of the embodiment shown in FIG. 56 depicted with the line holding mechanism removed.
Figure 65:
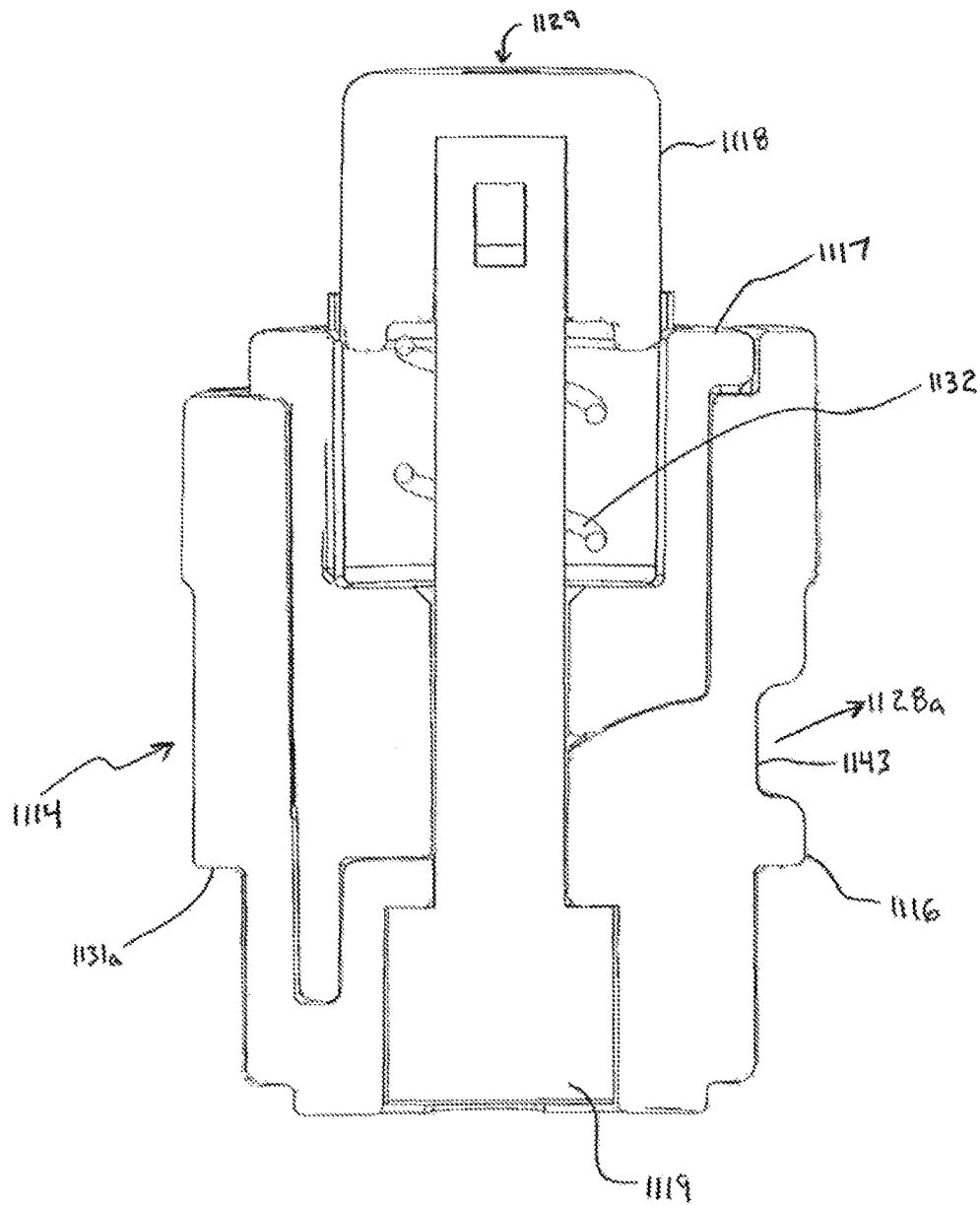
FIG. 65 is a cutaway line drawing of the line holding mechanism of the embodiment shown in FIG. 56 taken through the blade.
Figure 66:
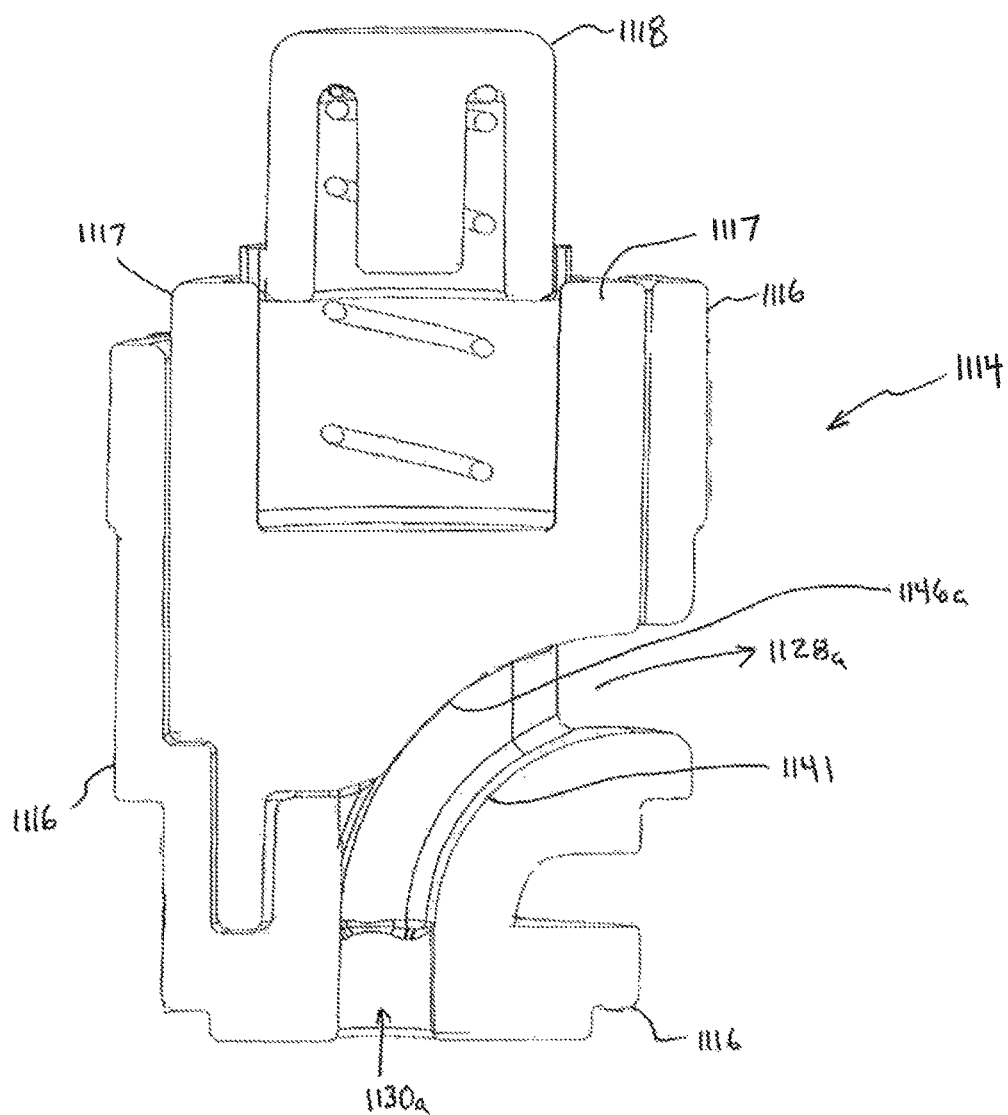
FIG. 66 is a cutaway line drawing of the line holding mechanism of the embodiment shown in FIG. 56 taken through one of the line channels.
Figure 67:
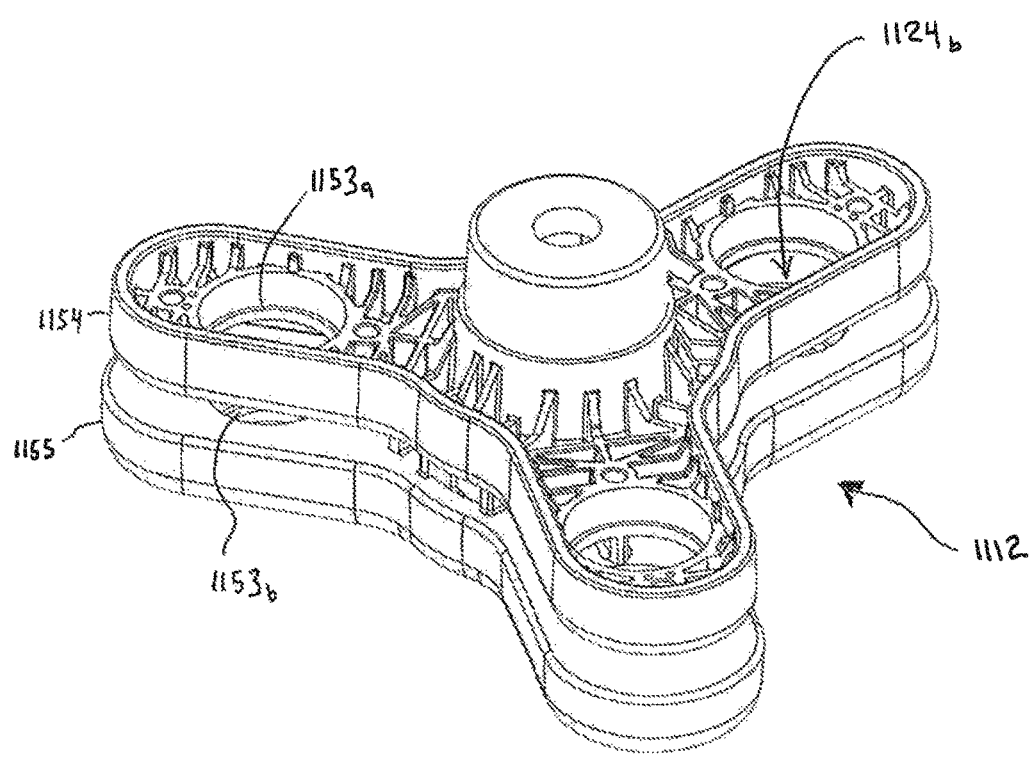
FIG. 67 depicts the main housing of the embodiment shown in FIG. 56.
Figure 68:
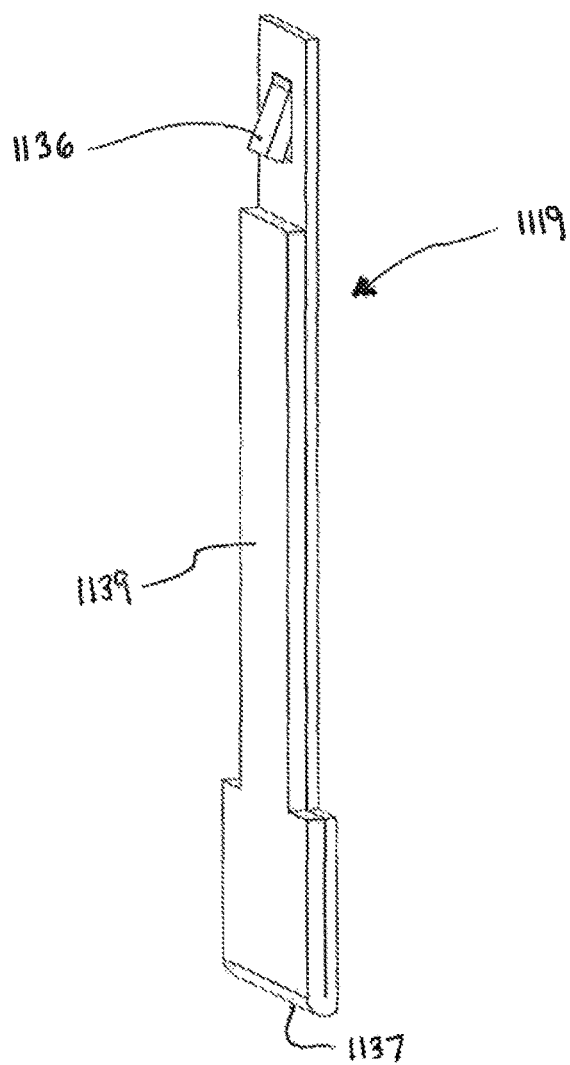
FIG. 68 depicts the blade use to push the line out of the line channel.
Figure 69:
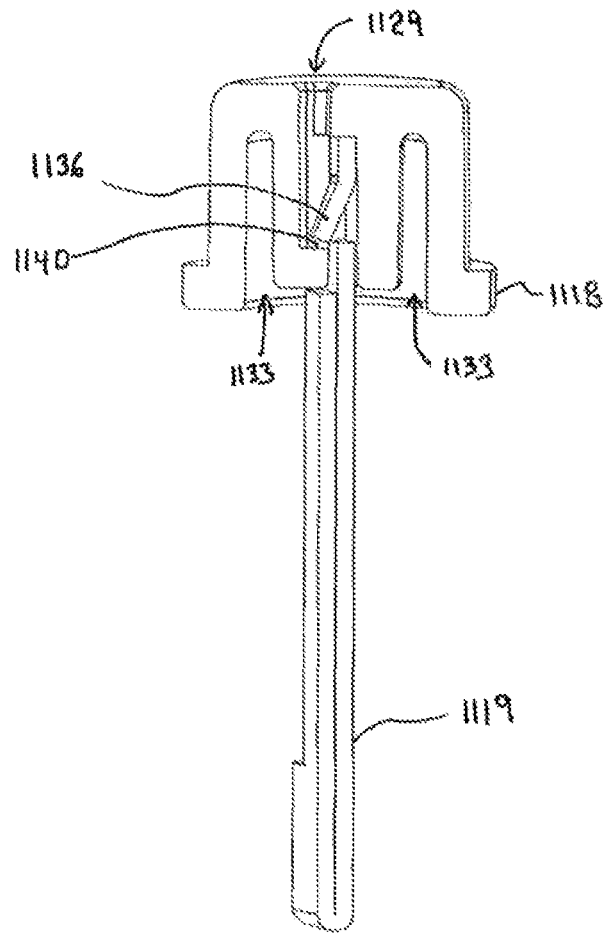
FIG. 69 is a cutaway view of the blade pressed into the button.

The bearing sleeve 115 will have a lower edge 151 (FIG. 54) that will rest on a ledge 153 located on the inside of openings 124 (see FIG. 32 for location of ledge 153). Referring to FIG. 55, the ledge 153 located on the lower layer 155 of the main housing in combination with the bearing sleeve 152 will support the downward facing surfaces of the line-holding mechanism 114. Once the bearing is installed, then the line-holding assembly can be inserted into opening 124. Then cover 113 is attached to the main housing 112 to retain the upper facing surfaces of the line-holding mechanism. The top of button 118 will extend through cover 113, allowing access to the user. The six screws 120 are used to fasten the cover to the main housing.

The novel design allows for a novel method for removing a used strip of folded trimmer line. The first step of the method involves the user pushing a button, which will cause a blade to push the folded portion on the trimmer line away from the lower surface of the line holding mechanism. The second step is for the user to release the button. The third step is for the user to then pinch the folded portion of line using the thumb and a finger tip. The fourth and final step is for the user to pull the line away from and out of the line holding mechanism.

A third embodiment of the present invention is depicted in FIGS. 56-69. The third embodiment functions generally in the same manner as the previous embodiment. The main differences between the embodiments is the shape of the perimeter head and the use of a second bearing sleeve on the pivoting line-holding mechanism in the third embodiment.

The shape of the third embodiment is a head 1110 with three projections or legs. Each projection contains one pivot post assembly 1114. The pivot post assembly is also called a line-holding assembly 1114.

These pivoting line-holding assemblies are similar in design to the line-holding assemblies used in head 110 in the first embodiment. The difference is that the shape has been modified to function with two bearing sleeves 1115a and 1115b. Bearing sleeve 1115a is mounted in the lower layer of the head 1155. Bearing sleeve 1115b is mounted in the upper layer of the head 1154. The purpose of adding a second bearing sleeve is to improve the pivoting motion (to minimize the resistance to pivoting).

The components in head 1110 have been numbered the same as the components in head 110, with the exception that all components numbers used with head 1110 have been indexed by 1100.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fixed line trimmer head for a powered rotary trimmer device, the trimmer head comprising:
   A main housing operatively attachable to the powered trimmer device for rotation at a relatively high speed, said main housing having a top surface facing upward when the powered trimmer device is in use and said main housing having an underside facing the ground when the powered trimmer device is in use;
   At least two line holder mechanisms peripherally spaced apart and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device;
   Wherein each of said lengths of trimmer line is inserted into each respective line holder mechanism from an underside of the main housing without necessitating removal of the trimmer head from the powered trimmer device;
   Wherein each of said line holder mechanisms further comprises:
      A lower housing having an interior surface and an adjacent upper housing having an interior surface, the interior surfaces of said lower housing and said upper housing defining a passageway for the flexible trimmer line;
      First and second inlet openings located on an underside of the lower housing and first and second outlet openings located on a vertical side of the lower housing, the passageway extending between the inlet openings and the outlet openings;
      Wherein the distal ends of a single length of flexible trimmer line may be inserted into said first and second inlet openings, fed through the passageway and pushed through the first and second outlet openings.

2. The fixed line trimmer head as claimed in claim 1, wherein said passageway further comprises two curvilinear channels, said channels separated by a rib.

3. The fixed line trimmer head as claimed in claim 2, wherein said curvilinear channels comprise a curve of approximately 90 degrees.

4. The fixed line trimmer head as claimed in claim 1, wherein said main housing further comprises:
   First and a second spaced layers, said first and second layers vertically connected to each other by a central hub;
   A pair of openings equal in number to the number of line holder mechanism, a first of each opening pair located in said first spaced main housing layer and a second of each opening pair located in said second spaced main housing layer, each pair of openings aligned vertically, each pair of openings shaped and sized to receive a line holder mechanism.

5. The fixed line trimmer head as claimed in claim 1, further comprising a means to push lengths of flexible trimmer line at least partially out of each line holder mechanism.

6. The fixed line trimmer head as claimed in claim 5 wherein said pushing means comprises an elongated vertical blade, said blade movable between a first upper position and a second lower position where the blade contacts the trimmer line at a point exterior of the line holder mechanism at a location on the trimmer line located approximately between the first and second inlet openings, said blade pushing the trimmer line out and away from the line holder mechanism and the underside of the main housing.

7. The fixed line trimmer head as claimed in claim 6, wherein said pushing means further comprises a spring and an actuator, said spring biasing the blade into the first upper position and said actuator moving the blade to the second lower position when activated.

8. A fixed line trimmer head for a powered rotary trimmer device, the trimmer head comprising:

A main housing operatively attachable to the powered trimmer device for rotation at a relatively high speed, said main housing having a top surface facing upward when the powered trimmer device is in use and said main housing having an underside facing the ground when the powered trimmer device is in use;

At least two line holder mechanisms peripherally spaced apart and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device;

Wherein each of said lengths of trimmer line is inserted into each respective line holder mechanism from an underside of the main housing without necessitating removal of the trimmer head from the powered trimmer device; and Means to push lengths of flexible trimmer line at least partially out of the underside of the main housing.

9. The fixed line trimmer head as claimed in claim 8, wherein said pushing means comprises an elongated vertical blade, said blade movable between a first upper position and a second lower position where the blade contacts the trimmer line at a point exterior of the line holder mechanism at a location on the trimmer line located approximately between the first and second inlet openings, said blade pushing the trimmer line out and away from the line holder mechanism and the underside of the main housing, and a spring and an actuator, said spring biasing the blade into the first upper position and said actuator moving the blade to the second lower position when activated.

10. A fixed line trimmer head for a powered rotary trimmer device, the trimmer head comprising:

A main housing operatively attachable to the powered trimmer device for rotation at a relatively high speed, said main housing having a top surface facing upward when the powered trimmer device is in use and said main housing having an underside facing the ground when the powered trimmer device is in use;

Three line holder mechanisms peripherally spaced apart 120 degrees and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device;

Each line holder mechanism comprising a lower housing having an interior surface and an adjacent upper housing having an interior surface, the interior surfaces of said lower housing and said upper housing defining two curvilinear channels for the flexible trimmer line; a first and a second inlet openings located on an underside of the lower housing and a first and a second outlet openings located on a vertical side of the lower housing, the channels extending between the inlet openings and the outlet openings; and wherein the distal ends of a single length of flexible trimmer line may be inserted each into said first and second inlet openings, fed through the channels and pushed through the first and second outlet openings;

Wherein each of said lengths of trimmer line is inserted into each respective line holder mechanism from an underside of the main housing without necessitating removal of the trimmer head from the powered trimmer device, and wherein unused lengths of trimmer line are easily removed from the underside of the main housing without necessitating removal of the trimmer head from the powered trimmer device.

11. A fixed trimmer head for a powered rotary trimmer device, the trimmer head comprising:

A main housing operatively attachable to the powered trimmer device for rotation at a relatively high speed;

At least two line holder mechanisms peripherally spaced apart and attached to said housing to achieve a balanced rotation about a vertical axis, said attachment of the line holder mechanisms allowing oscillation of each line holder mechanism about their respective vertical axes, each line holder mechanism capable of securing a separate length of flexible trimmer line in said housing during rotational operation of the powered trimmer device;

means to push lengths of flexible trimmer line at least partially out of each line holder mechanism.

12. The fixed line trimmer head as claimed in claim 11 wherein said pushing means comprises an elongated vertical blade, said blade movable between a first upper position and a second lower position where the blade contacts the trimmer line at a point exterior of the line holder mechanism, said blade pushing the trimmer line out and away from the line holder mechanism.

13. The fixed line trimmer head as claimed in claim 12, wherein said pushing means further comprises a spring and an actuator, said spring biasing the blade into the first upper position and said actuator moving the blade to the second lower position when activated.

14. A method of removing unused trimmer line from a fixed line trimmer head, comprising the steps of:

Activating a removal actuator by depressing said actuator;

Said actuator moving an elongated blade from a first biased upper position to a second unbiased lower position to effectuate movement of unused trimmer line away from the underside of said trimmer head;

Releasing said actuator and allowing the elongated blade to return to the first biased upper position;

Grasping the unused trimmer line from the underside of the trimmer head;

Pulling said unused trimmer line away from the underside of the trimmer head.

* * * * *